United States Patent [19]
Kageyama et al.

[11] Patent Number: 5,532,914
[45] Date of Patent: Jul. 2, 1996

[54] DC-DC CONVERTER APPARATUS

[75] Inventors: Hironobu Kageyama; Mitsuo Nakamura, both of Kawasaki, Japan

[73] Assignee: Fujitsu Limited, Japan

[21] Appl. No.: 202,578

[22] Filed: Feb. 28, 1994

[30] Foreign Application Priority Data

Apr. 30, 1993 [JP] Japan .................................. 5-104574

[51] Int. Cl.[6] .................................................. H02H 7/10
[52] U.S. Cl. .................... 363/50; 363/49; 363/65; 307/82
[58] Field of Search ........................... 363/49, 50, 55, 363/65, 123, 15, 95; 307/82

[56] References Cited

U.S. PATENT DOCUMENTS

| | | |
|---|---|---|
| Re. 34,462 | 11/1993 | Whittle ................................ 363/49 |
| 4,975,592 | 12/1990 | Hahn et al. ........................... 363/21 |
| 5,341,278 | 8/1994 | Brooks ................................. 363/76 |

Primary Examiner—Peter S. Wong
Assistant Examiner—Shawn Riley
Attorney, Agent, or Firm—Staas & Halsey

[57] ABSTRACT

A DC-DC converter apparatus includes a main converter section, a main control section, a supplemental power supply section, a signal processing section and a supplemental control section. The main converter section converts a D.C. input into an adequate D.C. output and supplies the converted D.C. output to a load. The supplemental power supply section supplies operating electric power to the main converter section and main control section of the DC-DC converter apparatus. The supplemental control section controls the operative or non-operative state of the supplemental power supply section based on a signal from the signal processing section. The main control section controls the operative or non-operative state of the main converter section in response to the operation of the supplemental power supply section.

10 Claims, 14 Drawing Sheets

DC-DC CONVERTER APPARATUS

BACKGROUND OF THE INVENTION

1. Field of the Invention

This invention relates to a DC-DC converter apparatus for converting a D.C. input into a stabilized output of different voltages, and more particularly, to reducing a standby current in the DC-DC converter apparatus when the DC-DC converter apparatus is in a non-operative state.

2. Description of the Related Art

A DC-DC converter apparatus is typically used as a power source of a data processing system for converting a D.C. input into a stabilized D.C. output having an adequate voltage and adequate power capacity to be supplied to a circuitry. A power source section is constructed by a plurality of DC-DC converter apparatuses and each of the DC-DC converter apparatuses supplies electric power to at least one load (i.e., the circuitry). At least one of the DC-DC converter apparatuses may have a main power supply circuit and a supplemental power supply circuit. The main power supply circuit converts a D.C. input into a stabilized D.C. output adequate for the load and supplies the converted D.C. output to the load. The supplemental power supply circuit converts the D.C. input into a plurality of D.C. outputs necessary for the operations of respective sections of the DC-DC converter apparatus and supplies the plurality of D.C. outputs of adequate voltages to the respective sections of the DC-DC converter apparatus. The main power supply circuit and supplemental power supply circuit are each constructed as a DC-DC converter. A D.C. power input to the DC-DC converter apparatus is D.C. power converted from A.C. power supplied from an A.C. power source by an AC-DC converter, for example.

When electric power is supplied to a load, both the main power supply circuit and the supplemental power supply circuit are operating. On the other hand, when no electric power is supplied to the load, that is, when the circuit of the load is not operating, the operation of the main power supply circuit is interrupted but the supplemental power supply circuit is still operating. The reason why the supplemental power supply circuit is still operating even when the main power supply circuit is set in the non-operative state is to set the main power supply circuit in the standby state so that the main power supply circuit can be immediately operated when necessary. Therefore, in the DC-DC converter apparatus, a current for operating the supplemental power supply, that is, a standby current, always flows.

When a large number of DC-DC converter apparatuses are used as the power source section of the apparatus, however, the standby current becomes large and an amount of heat generated in a power distribution unit for supplying D.C. power to the DC-DC converter apparatuses becomes large. Typically, the power distribution unit is constructed of AC-DC converters. If the amount of generated heat becomes large, as described above, however, it becomes necessary to increase the cooling capacity of the power distribution unit. When the amount of generated heat of the power distribution unit becomes larger and the heat of the power distribution unit cannot be sufficiently radiated by natural air-cooling, a cooling fan is used to forcedly cool the power distribution unit, thereby suppressing the heat generation of the power distribution unit.

Thus, in the conventional DC-DC converter apparatus, even if the main power supply circuit is interrupted, an unwanted power caused by a standby current or the sum of the standby currents and the driving current for the cooling fan is consumed. Further, when the cooling fan is driven, noise is generated by the rotation of the fan.

SUMMARY OF THE INVENTION

It is therefore an object of the present invention to provide a DC-DC converter apparatus capable of effectively suppressing the power consumption in a state in which the load is not operating.

It is a further object of the present invention to provide a DC-DC converter apparatus which reduces unwanted power consumption.

A DC-DC converter apparatus of this invention includes a main converter section, a supplemental power supply section, a main control section and a supplemental control section. The main converter section is constructed as a DC-DC converter for converting a D.C. input into a D.C. output having a preset voltage. The main converter section also supplies the stabilized D.C. power required for a load to the load. The supplemental power supply section supplies D.C. power necessary for the operations of respective sections of the DC-DC converter apparatus to the respective sections. The supplemental control section controls the operation of the supplemental power supply section to set the supplemental power supply section into the operative state or non-operative state. The main control section controls the operation of the main converter section based on an output obtained when the supplemental power supply section is set in the operative or non-operative state by the supplemental control section so as to set the main converter into the operative state or non-operative state.

Typically, the main converter includes a main power supply circuit and the supplemental power supply section includes a supplemental power supply circuit including a DC-DC converter. The supplemental control section may include an external signal processing section for controlling the operative/non-operative state of the supplemental power supply section according to an externally supplied signal. The supplemental control section may include a switch circuit for controlling the operative/non-operative state of the supplemental power supply section. The main control section may include a sequence processing section for controlling the operative/non-operative state of the main converter section according to a preset sequence in relation to the operation of the supplemental control section.

The above preset sequence causes the main converter section to be operated after operating the supplemental power supply section at the time of turn-ON of the power source of the DC-DC converter apparatus and causes the operation of the supplemental power supply section to be interrupted after interrupting the operation of the main converter section at the time of turn-OFF of the power source of the DC-DC converter apparatus.

The main control section may include an output stabilizing section for stabilizing the voltage of a power supply output of the main converter section. Further, it is possible to provide an operation monitoring section for monitoring whether the operation of the main converter section is normal or abnormal.

In the DC-DC converter apparatus of this invention, when the supplemental power supply section is set into the operative state by controlling the operative/non-operative state of the supplemental power supply section by the supplemental control section, the supplemental power supply section converts a D.C. input into a preset D.C. voltage and supplies electric power to respective sections of the DC-DC converter apparatus. When the main control section specifies the operative or non-operative state of the main converter section based on an output of the supplemental control section obtained when the supplemental power supply section is set in the operative or non-operative state, the main converter section converts the D.C. input into a preset D.C. voltage and supplies electric power to the load.

In order to interrupt the operation of the DC-DC converter apparatus and set the same into the non-operative state, the main converter section is not operated and the operation of the supplemental power supply section is interrupted. Therefore, when the DC-DC converter apparatus is set in the non-operative state, no standby current flows, thereby making it possible to prevent generation of unwanted power consumption. Further, the operation of the DC-DC converter apparatus can be started or interrupted with the output thereof kept stable and without setting the output thereof into an abnormal state, by operating the main converter section after the supplemental power supply section is operated when the DC-DC converter apparatus is operated, and by interrupting the operation of the supplemental power supply section after the operation of the main converter section is interrupted when the power source switch of the DC-DC converter apparatus is turned OFF.

BRIEF DESCRIPTION OF THE DRAWINGS

Other objects and advantages of the invention will become apparent during the following discussion in conjunction with the accompanying drawings, in which.

DETAILED DESCRIPTION OF THE PREFERRED EMBODIMENTS

Embodiments of this invention will now be described with reference to the accompanying drawings.

Figure 1:
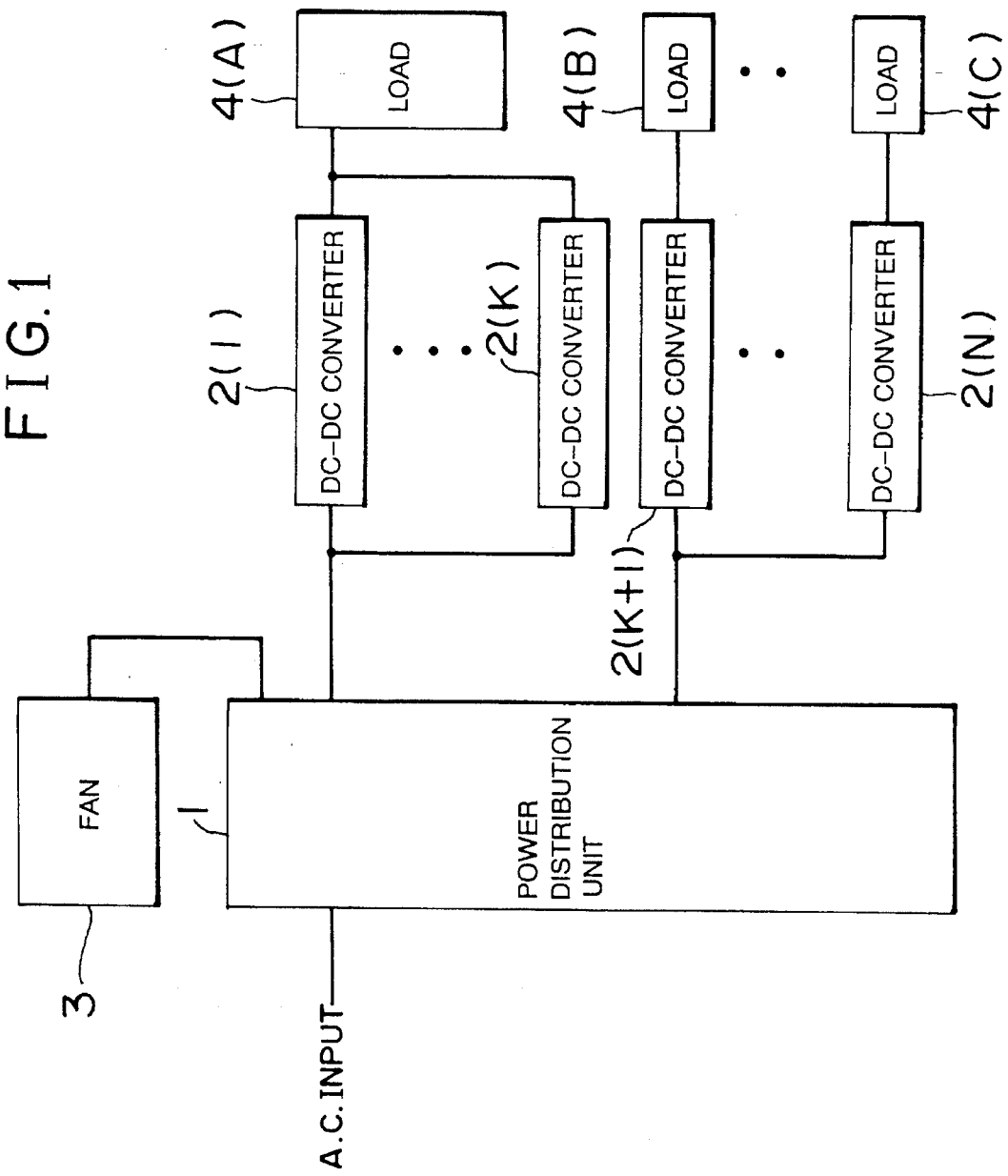
FIG. 1 is a block diagram showing the whole construction of a power supply including a DC-DC converter apparatus according to this invention.

The whole construction of a power supply including a DC-DC converter apparatus according to a first embodiment of this invention is shown in FIG. 1. The power supply shown in FIG. 1 includes a power distribution unit 1, DC-DC converter apparatuses 2(1), ..., 2(K), 2(K+1), ..., 2(N), a cooling fan 3, and the plurality of DC-DC converter apparatuses 2(1), ..., 2(K), 2(K+1), ..., 2(N) connected to a plurality of loads 4(A), 4(B), (C), ... The power distribution unit 1 includes an AC-DC converter, and converts an A.C. input into D.C. outputs and supplies the outputs to the DC-DC converter apparatuses 2(1), ..., 2(K), 2(K+1), ..., 2(N). The power distribution unit 1 also supplies electric power to drive the cooling fan 3 for cooling all of the converter apparatuses.

The DC-DC converter apparatuses 2(1), ..., 2(K), 2(K+1), ..., 2(N) convert D.C. inputs into stable D.C. outputs necessary for the respective loads and supply the stable D.C. outputs to the respective loads 4(A), 4(B), 4(C), ... For example, in the case of FIG. 1, the DC-DC converter apparatuses 2(1) to 2(K) supply electric power to the load 4(A), and the DC-DC converter apparatuses 2(K+1) and 2(N) supply electric power to the corresponding loads 4(B) and 4(C).

Figure 2:
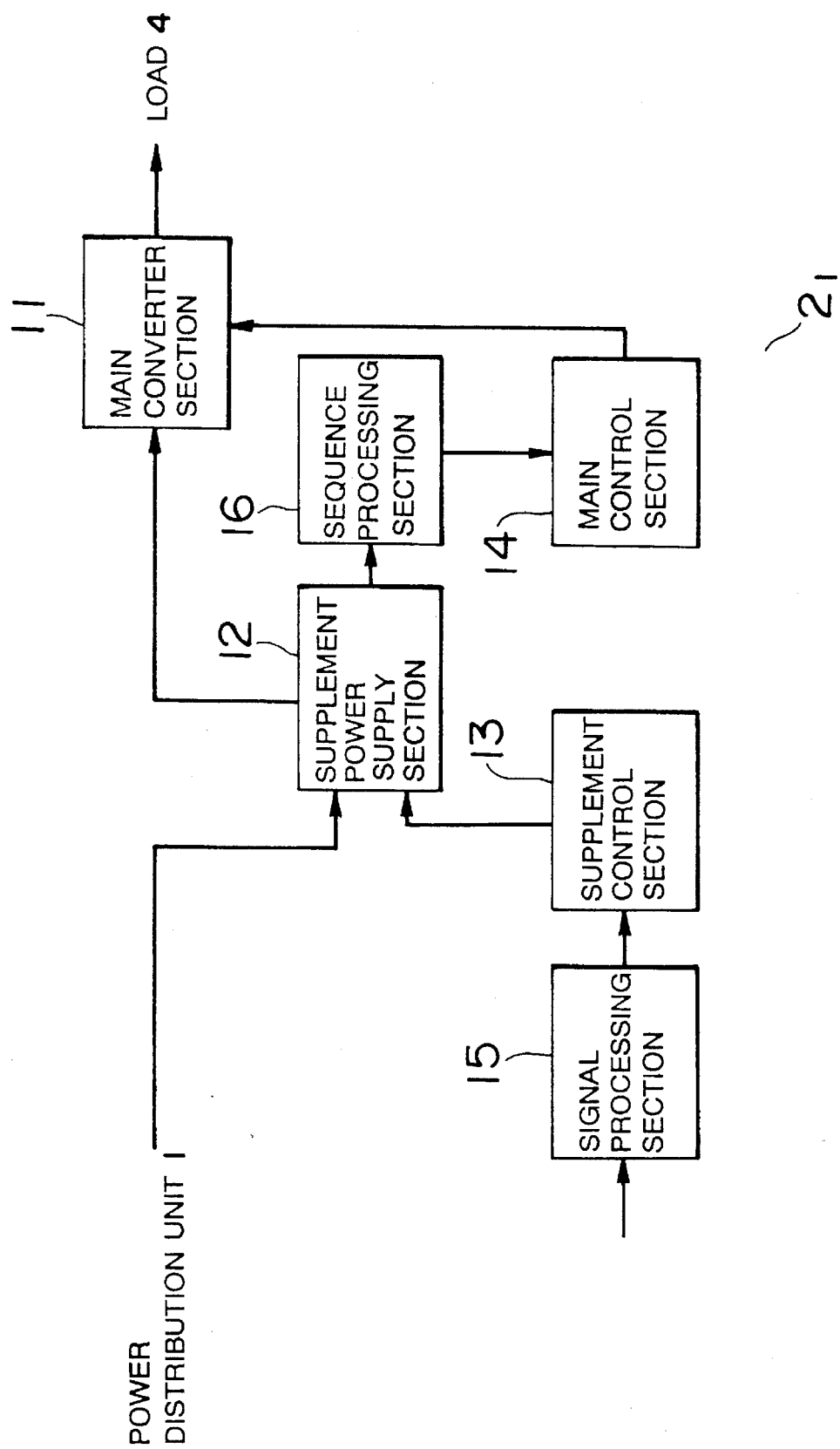
FIG. 2 is a block diagram showing the construction of a DC-DC converter apparatus according to a first embodiment of this invention.

The construction of each of the DC-DC converter apparatuses 2(1) to 2(N) of FIG. 1 is shown in FIG. 2. In FIG. 2, a DC-DC converter apparatus $2_1$ represents any one of the DC-DC converter apparatuses 2(1) to 2(N) and the DC-DC converter apparatus $2_1$ supplies electric power to a load 4 (which represents any one of the loads 4(A), 4(B), ... ). The DC-DC converter apparatus $2_1$ shown in FIG. 2 is a basic DC-DC converter apparatus based on this invention, and the DC-DC converter apparatus $2_1$ includes a main converter section 11, supplemental power supply section 12, main control section 13, supplemental control section 14, external signal processing section 15 and sequence processing section 16.

The main converter section 11 converts a D.C. input into adequate D.C. power which meets the condition required by the load 4 and supplies the converted D.C. power to the load 4. The supplemental power supply section 12 converts a D.C. input into adequate D.C. outputs which meet the conditions required by the respective sections of the DC-DC converter apparatus $2_1$ and supplies the converted D.C. outputs to the respective sections. The main converter section 11 includes a main power supply circuit and the supplemental power supply section 12 includes a supplemental power supply circuit.

The supplemental control section 13 controls the operation of the supplemental power supply section 12 and selectively sets the supplemental power supply section 12 into the operative or non-operative state.

The main control section 14 controls the main converter section 11 according to the operative/non-operative state of the supplemental power supply section 12 controlled by the supplemental control section 13 to set the main converter section 11 into the operative state or non-operative state. In this case, the main control section 14 effects the control operation for monitoring and stabilizing the output voltage of the main converter section 11 in addition to the control operation for setting the operative/non-operative state of the main converter section 11.

The external signal processing section 15 issues a control instruction to the supplemental control section 13 in response to an external signal for controlling the operative/non-operative state of the DC-DC converter apparatus $2_1$.

The sequence processing section 16 operates the main converter section 11 after operating the supplemental power supply section 12 at the time of turn-ON of the power source switch, that is, when the power supply by the DC-DC converter apparatus $2_1$ is started, and the sequence processing section 16 interrupts the operation of the supplemental power supply section 12 after interrupting the operation of the main converter section 11 at the time of turn-OFF of the power source switch, that is, when the power supply by the DC-DC converter apparatus $2_1$ is interrupted.

In the DC-DC converter apparatus $2_1$ shown in FIG. 2, for example, when the supplemental control section 13 operates the supplemental power supply section 12 according to an external signal via the external signal processing section 15, the supplemental power supply section 12 converts a D.C. input into adequate D.C. outputs required by the respective sections of the DC-DC converter apparatus $2_1$. When the main control section 14 operates the main converter section 11 according to the operation of the supplemental power supply section 12, the main converter section 11 converts a D.C. input into an adequate D.C. output and supplies the same to the load 4.

When the operation of the DC-DC converter apparatus $2_1$ is interrupted, the control operation for the main converter section 11 is not affected, and at the same time, the operation of the supplemental power supply section 12 is interrupted by the supplemental control section 13. Therefore, no standby current flows and unwanted power consumption can be effectively prevented.

Further, since the sequence processing section 16 controls the main control section 14 to operate the main converter section 11 after operating the supplemental power supply section 12 when the DC-DC converter apparatus $2_1$ starts supply of electric power and interrupts the operation of the supplemental power supply section 12 after interrupting the operation of the main converter section 11 when the DC-DC converter apparatus $2_1$ interrupts supply of electric power, an output of the main converter section 11 can be interrupted in a stable state without causing an abnormal voltage, for example.

Figure 3:
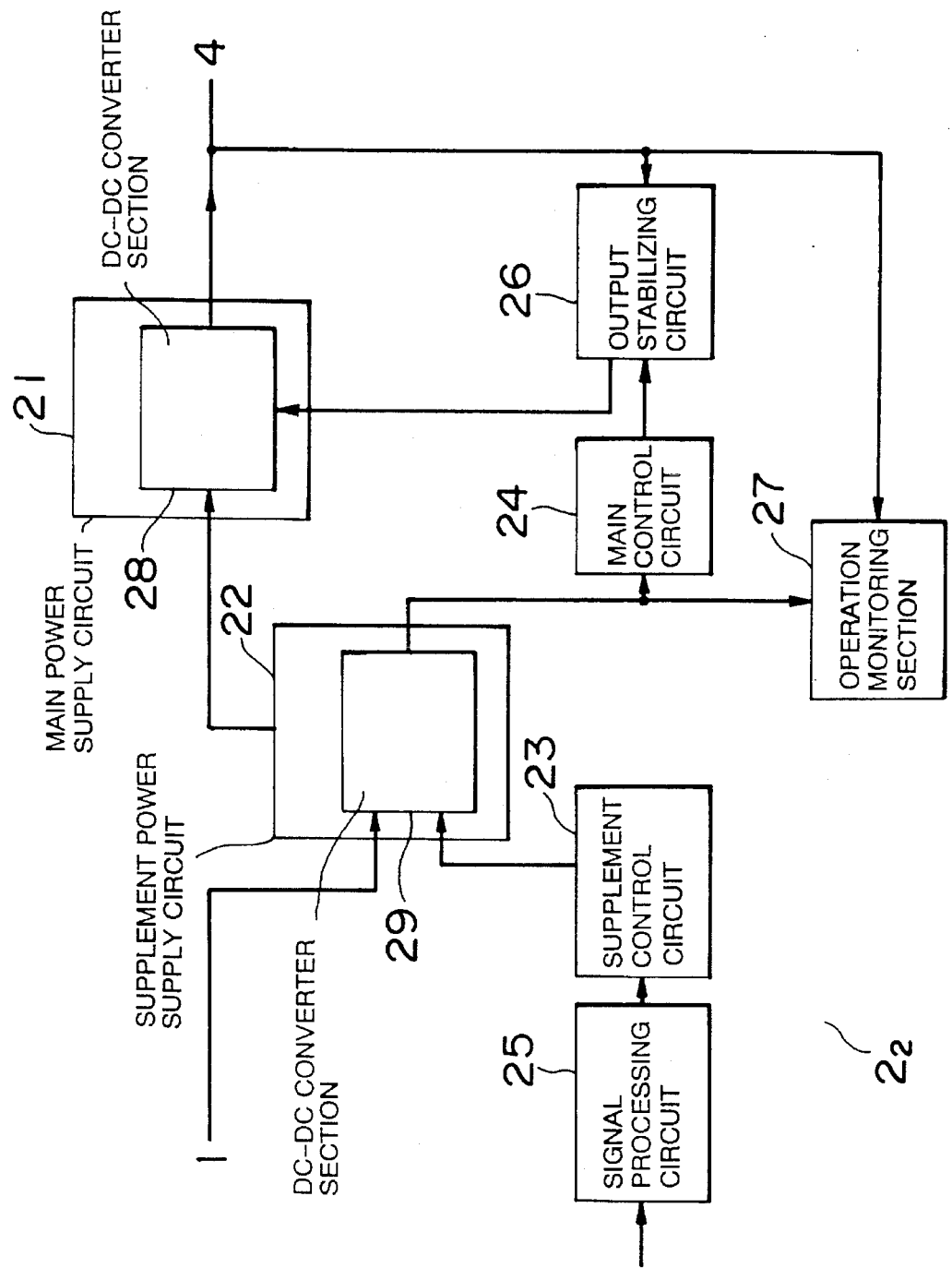
FIG. 3 is a block diagram showing the construction of a DC-DC converter apparatus according to a second embodiment of this invention.

The construction of the second embodiment of a DC-DC converter apparatus according to this invention is shown in FIG. 3. Like the case of FIG. 2, the DC-DC converter apparatus $2_2$ of FIG. 3 is used as any one of the DC-DC converter apparatuses 2(1) to 2(N) of FIG. 1.

The DC-DC converter apparatus 22 of FIG. 3 includes a main power supply circuit 21, supplemental power supply circuit 22, supplemental control circuit 23, main control circuit 24, signal processing circuit 25, output stabilizing circuit 26 and operation monitoring section 27.

The main power supply circuit 21 includes a DC-DC converter section 28 which is connected to the power distribution unit 1 of FIG. 1. The DC-DC converter section 28 converts a D.C. output from the power distribution unit 1 into a stabilized D.C. output required by the load 4 and supplies the converted D.C. output to the load 4.

The supplemental power supply circuit 22 includes a DC-DC converter section 29 which is connected to the power distribution unit 1. The DC-DC converter section 29 converts part of a D.C. output of the power distribution unit 1 into D.C. outputs necessary for the operations of the respective sections of the DC-DC converter apparatus $2_2$ and includes a stabilizing circuit for stabilizing and supplying the output voltages to the respective sections.

The signal processing circuit 25 receives an external signal for controlling the turn-ON/turn-OFF of the power source of the DC-DC converter apparatus $2_2$ and the like, that is, controlling the operative/non-operative state of the DC-DC converter apparatus $2_2$ from a power supply control section (not shown) and operates the supplemental control circuit 23 according to the received signal.

The supplemental control circuit 23 controls the operative/non-operative state of the supplemental power supply circuit 22 in response to the control signal from the signal processing circuit 25.

An operation output of the DC-DC converter section 29 of the supplemental power supply circuit 22 is also supplied to the main control circuit 24 and operation monitoring circuit 27.

The main control circuit 24 is operated based on a signal from the supplemental power supply circuit 22 to supply a control signal for controlling the operative/non-operative state of the main power supply circuit 21 to the output stabilizing circuit 26.

The output stabilizing circuit 26 controls the operative/non-operative state of the main power supply circuit 21 in response to a signal from the main control circuit 24, and at the same time, monitors and stabilizes an output voltage of the main power supply circuit 21.

The operation monitoring circuit 27 checks whether the operation of the main power supply circuit 21 is abnormal or not according to an output of the main power supply circuit 21. Further, the operation monitoring circuit 27 is operated by supply of the power from the supplemental power supply circuit 22. For example, the operation monitoring section 27 monitors the overcurrent, overvoltage, low voltage, abnormal temperature and the like in the DC-DC converter apparatus $2_2$, and when an abnormal condition is detected, an adequate measure such as generation of an alarm sound, an alarm display, an interruption of operation or an abnormal condition recovering process is taken according to the content of the abnormal condition.

Figure 4:
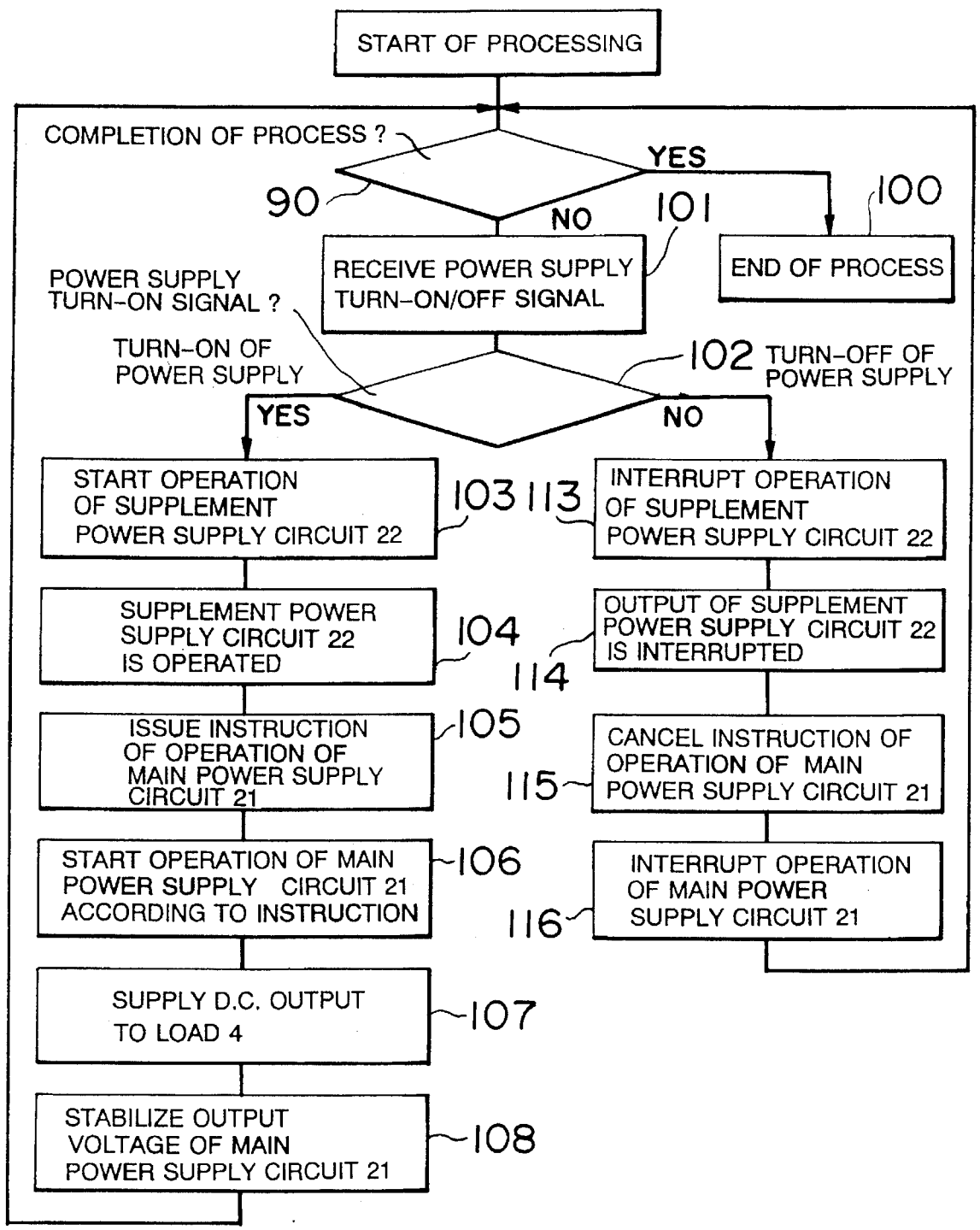
FIG. 4 is a flowchart for illustrating the operation of the DC-DC converter apparatus of FIG. 3.

The operation of the DC-DC converter apparatus $2_2$ of FIG. 3 is explained with reference to the flowchart shown in FIG. 4.

When the process is started, whether the process is completed or not is first determined (step 90). If the process is not completed, the signal processing circuit 25 waits for reception of a power supply turn-ON signal for starting the operation of the DC-DC converter apparatus 22 from the power supply control section (not shown) or a power supply turn-OFF signal for interrupting the operation of the DC-DC converter apparatus $2_2$ (step 101). When receiving the power supply turn-ON signal or power supply turn-OFF signal, the signal processing circuit 25 determines whether the signal is the power supply turn-ON signal or power supply turn-OFF signal (step 102).

If the received signal is determined to be the power supply turn-ON signal in the step 102, the supplemental control circuit 23 starts the operation of the supplemental power supply circuit 22 in response to the power supply turn-ON signal (step 103). Then the DC-DC converter section 29 of the supplemental power supply circuit 22 converts electric power which is part of a D.C. output from the power distribution unit 1 into D.C. outputs necessary for the respective sections of the DC-DC converter apparatus $2_2$, supplies the same and stabilizes the output voltage (step 104). The main control circuit 24 issues an instruction for operation of the main power supply circuit 21 to the output stabilizing circuit 26 in response to an output of the supplemental power supply circuit 22 (step 105).

The output stabilizing circuit 26 starts the operation of the main power supply circuit 21 in response to the operating instruction (step 106). When the main power supply circuit 21 is operated, the DC-DC converter circuit 28 converts a D.C. input from the power distribution unit 1 into a stabilized D.C. output for the load 4 and supplies the D.C. output to the load 4 (step 107).

Further, the output stabilizing circuit 26 controls the DC-DC converter 28 to stabilize the output voltage of the main power supply circuit 21 while monitoring the output voltage of the main power supply circuit 21 (step 108). Then, the step 90 is effected again, and when the process is completed, the process is terminated (step 100).

If the process is not completed and a next process to be effected remains, the step 100 is effected again.

On the other hand, if the received signal is determined to be the power supply turn-OFF signal in the step 102, the supplemental control circuit 23 interrupts the operation of the supplemental power supply circuit 22 in response to the power supply turn-OFF signal (step 113). Interruption of the operation of the supplemental power supply circuit 22 causes an output of the DC-DC converter section 29 to be interrupted (step 114). Further, the main control circuit 24 issues an instruction for canceling the operating instruction to the output stabilizing circuit 26 in response to the operation interruption (step 115).

The output stabilizing circuit 26 interrupts the operation of the main power supply circuit 21 in response to cancellation of the operating instruction (step 116). When the operation of the main power supply circuit 21 is interrupted, the step 90 is effected again, and if the process is completed, the process is terminated (step 100). If the process is not completed and a next process to be effected remains, the step 101 is effected.

Specifically, the determination in the step 90 whether the process is completed or not is made such that the process is determined to be completed when a main switch of the device having the power source contained therein is turned OFF to completely turn OFF the power source and the process is not determined to be completed in the other case, for example.

Thus, in the DC-DC converter apparatus $2_2$, since the main power supply circuit 21 is not operated and the operation of the supplemental power supply circuit 22 is interrupted when the operation of the DC-DC converter apparatus is interrupted, no standby current flows. Therefore, since unwanted power consumption can be prevented and it becomes unnecessary to operate the cooling fan 3 because of the reduction in the power consumption at the time of interruption of the operation of the DC-DC converter apparatus, the power consumption can be further reduced.

Further, since the operation monitoring section 27 monitors the operation of the main power supply circuit 21, an abnormal condition such as an overcurrent can be detected, thereby enhancing the reliability of the DC-DC converter apparatus.

Figure 5:
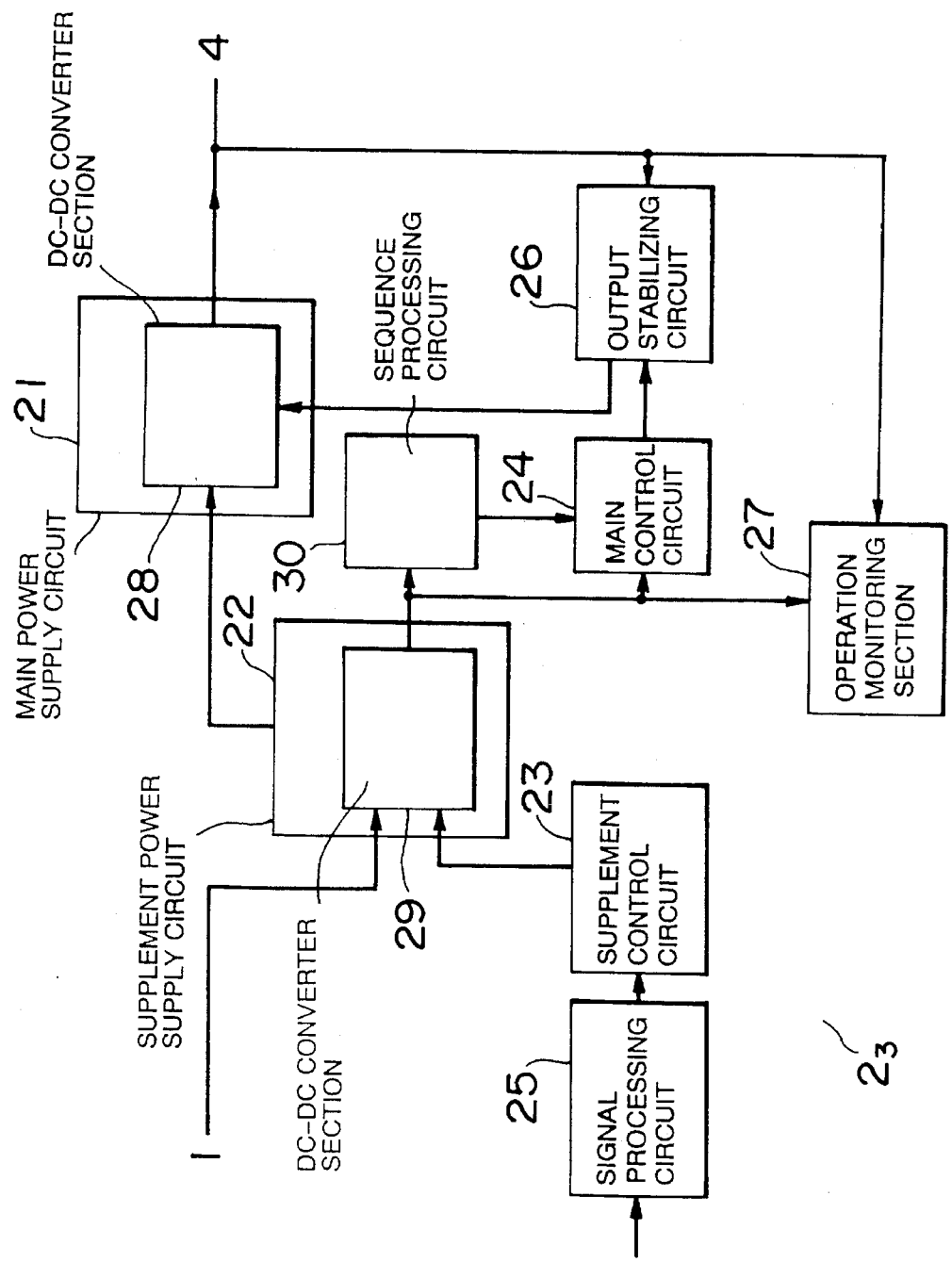
FIG. 5 is a block diagram showing the construction of a DC-DC converter apparatus according to a third embodiment of this invention.

The construction of a third embodiment of a DC-DC converter apparatus according to this invention is shown in FIG. 5. Like the case of FIG. 2 or FIG. 3, the DC-DC converter apparatus $2_3$ of FIG. 5 is used as any one of the DC-DC converter apparatuses 2(1) to 2(N) of FIG. 1 and the same reference numerals are attached to the same portions as those of FIG. 3.

The DC-DC converter apparatus $2_3$ of FIG. 5 is different from the DC-DC converter apparatus $2_2$ of FIG. 3 in that a sequence processing circuit 30 is provided between the supplemental power supply circuit 22 and the main control circuit 24.

The sequence processing circuit 30 supplies a control signal to the main control circuit 24 according to a preset sequence based on an output of the supplemental power supply circuit 22. In this case, the sequence processing circuit 30 creates a control signal for controlling the main control circuit 24 to operate the main power supply circuit 21 after operating the supplemental power supply circuit 22 when the operation of the DC-DC converter apparatus $2_3$ is started and interrupts the supplemental power supply circuit 22 after operating the main power supply circuit 21 when the operation of the DC-DC converter apparatus $2_3$ is interrupted.

Figure 6:
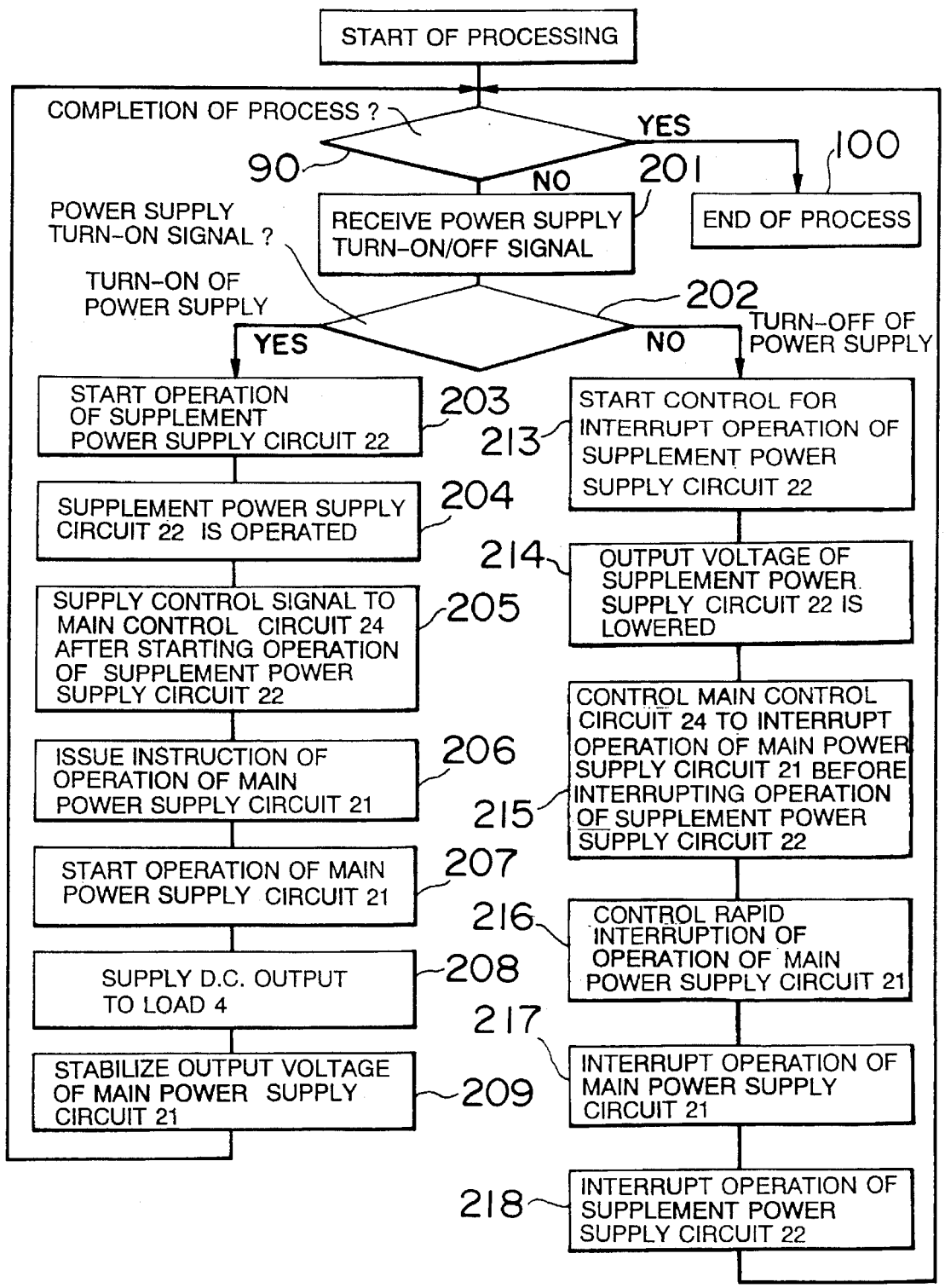
FIG. 6 is a flowchart for illustrating the operation of the DC-DC converter apparatus of FIG. 5.

The operation of the DC-DC converter apparatus $2_3$ is explained with reference to the flowchart of FIG. 6.

When the process is started, whether the process is completed or not is first determined (step 90). When the process is not completed, the signal processing circuit 25 waits for a power supply turn-ON signal for starting the operation of the DC-DC converter apparatus $2_3$ from a power supply control section (not shown) or a power supply turn-OFF signal for interrupting the operation of the DC-DC converter apparatus $2_3$ (step 201). When receiving the power supply turn-ON signal or power supply turn-OFF signal, the signal processing circuit 25 determines whether the received signal is the power supply turn-ON signal or power supply turn-OFF signal (step 202).

If it is determined in the step 202 that the received signal is the power supply turn-ON signal, the supplemental control circuit 23 starts the operation of the supplemental power supply circuit 22 in response to the power supply turn-ON signal (step 203). Then, the DC-DC converter section 29 of the supplemental power supply circuit 22 converts electric power which is part of a D.C. output of the power distribution unit 1 into D.C. outputs necessary for the respective sections of the DC-DC converter apparatus $2_3$, outputs the same and stabilizes the output voltages (step 204).

The sequence processing circuit 30 outputs a control signal to the main control circuit 24 after a preset period of time in response to the output of the supplemental power supply circuit 22 so as to operate the main power supply circuit 21 after the operation of the supplemental power supply circuit 22 is started (step 205).

The main control circuit 24 issues an instruction for operation of the main power supply circuit 21 to the output stabilizing circuit 26 in response to an output of the sequence processing circuit 30 (step 206).

The output stabilizing circuit 26 starts the operation of the main power supply circuit 21 according to the operating instruction (step 207). When the main power supply circuit 21 is operated, the DC-DC converter section 28 converts a D.C. input from the power distribution unit 1 into a stabilized D.C. output suitable for the load 4 and supplies the converted D.C. output to the load 4 (step 208).

Further, the output stabilizing circuit 26 controls the DC-DC converter section 28 while monitoring the output voltage of the main power supply circuit 21 so as to stabilize the output voltage of the main power supply circuit 21 (step 209). Then, the step 90 is effected again, and when the process is completed, the process is terminated (step 100).

If the process is not completed and a next process to be effected remains, the step 201 is effected.

On the other hand, if the received signal is determined to be the power supply turn-OFF signal in the step 202, the supplemental control circuit 23 starts to interrupt the operation of the supplemental power supply circuit 22 in response to the power supply turn-OFF signal (step 213) and the voltage of the supplemental power supply circuit 22 is gradually lowered (step 214). At this time, the sequence processing circuit 30 controls the main control circuit 24 to first interrupt the operation of the main power supply circuit 21 and to then interrupt the operation of the supplemental power supply circuit 22 (step 215).

By the above control operation, the main control circuit 24 issues an instruction for cancellation of the operation instruction and rapid interruption to the output stabilizing circuit 26 (step 216). The output stabilizing circuit 26 interrupts the main power supply circuit 21 according to the instruction for rapid interruption (step 217). After the operation of the main power supply circuit 21 is completely interrupted, the operation of the supplemental power supply circuit 22 is completely interrupted (step 218).

The above operation can be attained by adequately determining the time constants of the main power supply circuit 21 and the supplemental power supply circuit 22 set at the time of interruption. If a satisfactory operation cannot be attained by determination of the time constants, it is possible to control the operation of the supplemental power supply circuit 22 or supplemental control circuit 23 by use of the sequence processing circuit 30. In this case, an output of the signal processing circuit 25 is supplied to the sequence processing circuit 30 and the sequence processing circuit 30 controls the main control circuit 24 and the supplemental power supply circuit 22 or supplemental control circuit 23.

When the operations of the main power supply circuit 21 and the supplemental power supply circuit 22 are interrupted, the step 90 is effected again, and when the process is completed, the process is terminated (step 100). If the process is not completed and a next process to be effected remains, the step 201 is effected.

Thus, in the DC-DC converter apparatus $2_3$ of FIG. 5, in addition to the effect obtained in the DC-DC converter apparatus $2_2$ of FIG. 3, the effect that the stable starting and interruption can be attained without causing an abnormal condition in the output voltage can be obtained. This is because the sequence processing circuit 30 operates the main power supply circuit 21 after operating the supplemental power supply circuit 22 when the power source switch of the DC-DC converter apparatus $2_3$ is turned ON and interrupts the operation of the supplemental power supply circuit 22 after interrupting the operation of the main power supply circuit 21 when the power source switch of the DC-DC converter apparatus is turned OFF.

Figure 7:
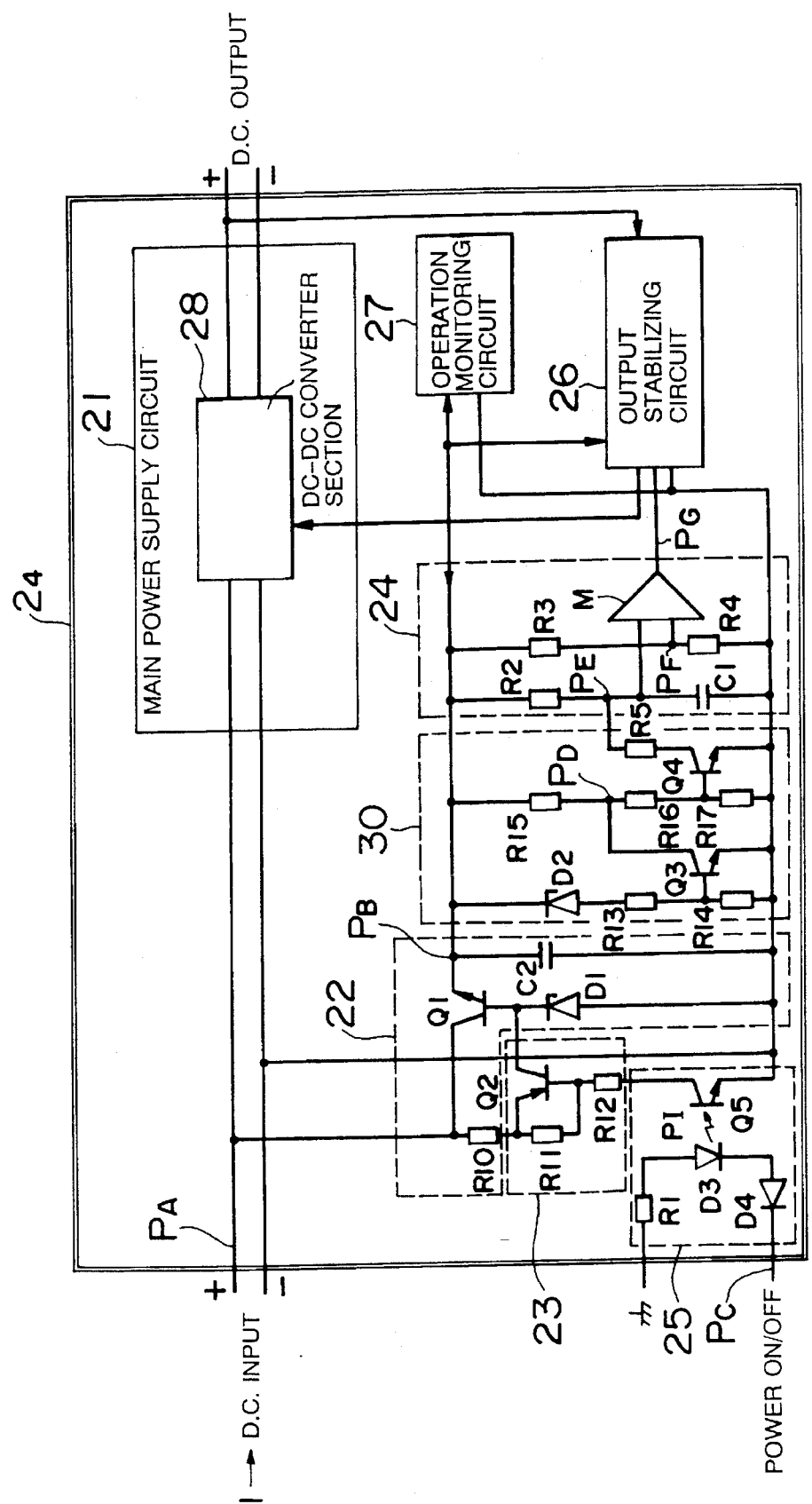
FIG. 7 is a block diagram showing the construction of a DC-DC converter apparatus according to a fourth embodiment of this invention.

The construction of a fourth embodiment of a DC-DC converter apparatus according to this invention is shown in FIG. 7.

The DC-DC converter apparatus $2_4$ of FIG. 7 is a DC-DC converter apparatus having a circuit construction obtained by more concretely constructing the DC-DC converter apparatus $2_3$ of FIG. 5 and portions which are substantially the same as those of FIG. 5 are denoted by the same reference numerals.

A supplemental power supply circuit 22 of the DC-DC converter apparatus $2_4$ of FIG. 7 is not a so-called DC-DC converter in this example, and is simply constructed as a stabilized power supply and includes a transistor Q1, zener diode D1, capacitor C2 and resistor R10.

A supplemental control circuit 23 of the DC-DC converter apparatus $2_4$ includes resistors R11, R12 and transistor Q2.

A main control circuit 24 of the DC-DC converter apparatus $2_4$ includes a comparator M, resistors R2, R3, R4 and capacitor C1.

A signal processing circuit 25 of the DC-DC converter apparatus $2_4$ includes a photo-isolator PI formed of a light emitting diode D3 and a phototransistor Q5, diode D4 and resistors R1.

A sequence processing circuit 30 of the DC-DC converter apparatus $2_4$ includes transistors Q3, Q4, resistors R5, R13, R14, R15, R16, R17 and zener diode D2.

The positive side (+) and negative side (−) of a D.C. input form the power distribution unit 1 are respectively supplied to the positive side power line and negative side power line of the DC-DC converter apparatus $2_4$.

The resistor R1 and diode D4 of the signal processing circuit 25 are series-connected to two ends of the light emitting diode D3 of the photo-isolator PI, respectively, and an external signal for controlling turn-ON/turn-OFF (permission/interruption) of the power supply of the DC-DC converter apparatus $2_4$ is supplied from a power control section (not shown) to a series circuit of the resistor R1-light emitting diode D3-diode D4. The emitter of the phototransistor Q5 is connected to the negative side power line.

The resistor R11 of the supplemental control circuit 23 is connected between the base and emitter of the transistor Q2 and the resistor R12 is connected between the base of the transistor Q2 and the collector of the phototransistor Q5.

The collector of the transistor Q1 of the supplemental power supply circuit 22 is connected to a positive side of the D.C. input, that is, an input side of the positive side power line and the emitter thereof is connected to an output side of the positive side power line. The resistor R10 is connected between the collector of the transistor Q1 and the emitter of the transistor Q2 of the supplemental control circuit 23. The zener diode D1 is connected between the base of the transistor Q1 and the negative side power line and the capacitor C1 is connected between the positive side power line connected to the emitter of the transistor Q1 and the negative side power line.

The zener diode D2 and resistor R13 of the sequence processing circuit 30 are serially connected. One end of the series circuit of the zener diode D2 and resistor R13 which lies on the zener diode D2 side is connected to the positive side power line connected to the emitter of the transistor Q1. The other end of the above series circuit which lies on the resistor R13 side is connected to the base of the transistor Q3. The emitter of the transistor Q3 is connected to the negative side power line and the resistor R14 is connected between the base and emitter of the transistor Q3. The resistor R15 is connected between the collector of the transistor Q3 and the emitter of the transistor Q1 and a series circuit of the resistors R16 and R17 is connected between the collector and emitter of the transistor Q3. The base of the transistor Q4 is connected to a connection node between the resistors R16 and R17, the emitter of the transistor Q4 is connected to the negative side power line, and the collector of the transistor Q4 is connected to one end of the resistor R5.

The resistor R2 of the main control circuit 24 is connected between the other end of the resistor R5 of the sequence processing circuit 30 and the positive side power line connected to the emitter of the transistor Q1. The capacitor C1 is connected between the resistor R2 and the negative side power line. A series circuit of the resistors R3 and R4 is connected between the positive side power line connected to the emitter of the transistor Q1 and the negative side power line. One input terminal of the comparator M is connected to a connection node between the resistor R2 and the capacitor C1 and the other input terminal is connected to a connection node between the resistors R3 and R4. An output of the comparator M is supplied to the output stabilizing circuit 26.

The positive side (+) and negative side (−) of the D.C. input are connected to the DC-DC converter section 28 of the main power supply circuit 21. Positive and negative outputs of the DC-DC converter section 28 of the main power supply circuit 21 are supplied to the load 4 as the positive side (+) and negative side (−) of the D.C. output. The negative side power line connected to the negative side (−) of the D.C. input is also connected to the output stabilizing circuit 26 and operation monitoring circuit 27. The positive side power line connected to the emitter of the transistor Q1 is also connected to the output stabilizing circuit 26 and operation monitoring circuit 27. An output of the DC-DC converter section 28 of the main power supply circuit 21, that is, the positive side (+) of the D.C. output is input to the output stabilizing circuit 26 and an output of the output stabilizing circuit 26 is supplied to the DC-DC converter section 28 of the main power supply circuit 21.

Figure 8:
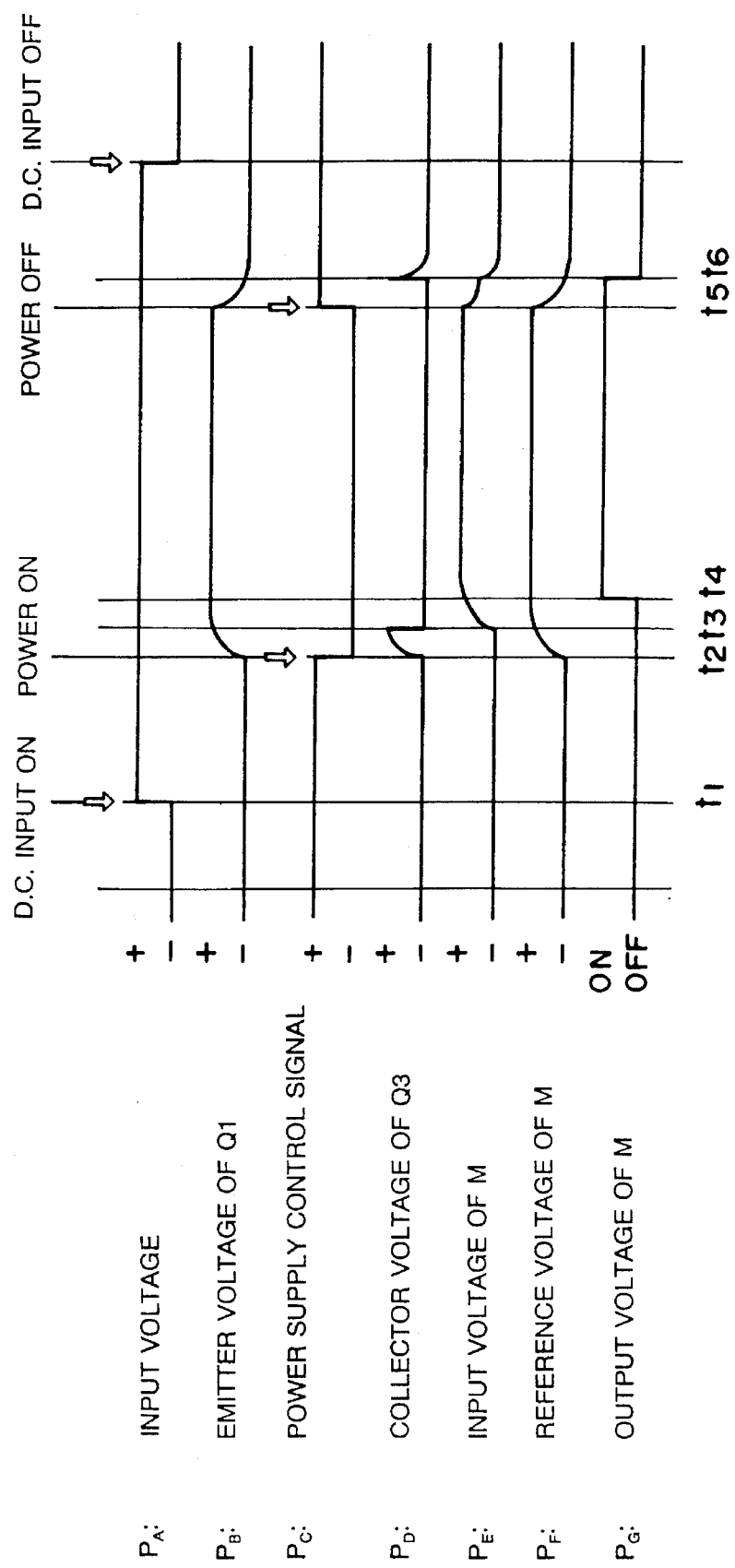
FIG. 8 is a timing chart for illustrating the operation of the DC-DC converter apparatus of FIG. 7.

FIG. 8 is a timing chart for illustrating the operation of the DC-C converter apparatus $2_4$ of the fourth embodiment shown in FIG. 7.

The timing chart of FIG. 8 indicates the transition of a process from the start of the operation of the DC-DC converter apparatus $2_4$ to the interruption of the operation thereof with time, that is, a variation in the position from the left to the right on the time base or abscissa.

The ordinates for the respective waves indicate voltages at points $P_A$ to $P_G$ in FIG. 7. The voltages of the respective waveforms in FIG. 8 are normalized and the maximum levels thereof are indicated to be the same, but in practice, the maximum voltages at the respective points $P_A$ to $P_G$ are different.

Next, the operation of the DC-DC converter apparatus $2_4$ of the fourth embodiment is specifically explained with reference to FIGS. 7 and 8.

First, at time t1, a D.C. input is supplied to the DC-DC converter apparatus $2_4$ and an input voltage at the point $P_A$ is set into the ON state ("+" level in FIG. 8). At this time, the power supply control signal at the point $P_C$ in the signal processing circuit 25 is set in the OFF state ("+" level in FIG. 8) and the phototransistor Q5 of the photo-isolator PI is set in the OFF state. Therefore, the transistor Q2 of the supplemental control circuit 23 is set in the OFF state and the transistor Q1 of the supplemental power supply circuit 22 is set in the OFF state so that the supplemental power supply circuit 22 will be kept non-operative.

Next, at time t2, if the power supply control signal at the point $P_C$ is set into the ON state ("−" level in FIG. 8), the light emitting diode D3 of the photo-isolator PI emits light to turn ON the phototransistor Q5. When the phototransistor Q5 is turned ON, a current flows into the transistor Q5 via the resistors R10, R11 and R12 to lower the base voltage of the transistor Q2 and the transistor Q2 is turned ON. Then, a collector output of the transistor Q2 is supplied to the zener diode D1 to raise the base voltage of the transistor Q1 and the transistor Q1 is turned ON.

When the transistor Q1 is turned ON, the emitter voltage of the transistor Q1 at the point $P_B$ gradually rises as shown in FIG. 8 and the supplemental power supply circuit 22 is operated to supply operating power to the sequence processing circuit 30, main control circuit 24, output stabilizing circuit 26 and operation monitoring circuit 27.

A rise in the emitter voltage of the transistor Q1 at the point $P_B$ causes the collector voltage of the transistor Q3 at the point PD to rise. When a rise in the collector voltage of the transistor Q3 causes breakdown of the zener diode D2 at time t3, the transistor Q3 is turned ON to lower the collector voltage of the transistor Q3 at the point $P_D$ and set the same to the "−" level as shown in FIG. 8.

Since the transistor Q4 is turned OFF by a drop in the collector voltage of the transistor Q3 at the point $P_D$, one of the input voltages of the comparator M at the point $P_E$ rises with the time constant determined by the resistor R2 and the capacitor C1. Since the other input voltage of the comparator M at the point $P_F$ is a voltage derived by dividing the emitter voltage of the transistor Q1 by use of the resistors R3 and R4, the waveform thereof becomes similar to the waveform of the emitter voltage of the transistor Q1 as shown in FIG. 8. That is, the input voltage of the comparator M at the point $P_E$ is used as an input voltage which is compared in the comparator M and the other input voltage of the comparator M at the point $P_F$ is used as a reference voltage for comparison by the comparator M.

Then, when the input voltage of the comparator M at the point $P_E$ becomes equal to or higher than the reference voltage at the point $P_F$ at time t4, an output of the comparator M at the point $P_G$ is set into the ON state to issue an instruction for operation of the main power supply circuit 21 to the output stabilizing circuit 26. In response to the operating instruction, the main power supply circuit 21 starts the operation.

On the other hand, if the power supply control signal at the point $P_C$ is set into the OFF state ("+" level in FIG. 8), the phototransistor Q5 of the photo-isolator PI is turned OFF. When the phototransistor Q5 is turned OFF, the transistor Q2 is turned OFF and the transistor Q1 is also turned OFF so as to gradually lower the emitter voltage of the transistor Q1 at the point $P_B$ and the supplemental power supply circuit 22 interrupts generation of output after a preset period of time.

If the emitter voltage of the transistor Q1 at the point $P_B$ becomes lower than a voltage (predetermined adequate voltage) determined by the zener diode D2 at time t6 before the above emitter voltage becomes equal to or lower than the reference voltage of the comparator M on the half-way of lowering in the emitter voltage of the transistor Q1 at the point $P_B$, the transistor Q3 is turned OFF and the transistor Q4 is turned ON.

At this time, the input voltage of the comparator M at the point $P_E$ is lowered with the time constant determined by the resistor R5 and the capacitor C1. When the input voltage at the point $P_E$ becomes equal to or lower than the reference voltage of the comparator M at the point $P_F$, an output voltage of the comparator M is set into the OFF state and the instruction for operation of the main power supply circuit 21 is canceled to interrupt the operation of the main power supply circuit 21.

After the operation of the main power supply circuit 21 is interrupted, the operation of the supplemental power supply circuit 22 is interrupted.

In the construction of the DC-DC converter apparatus $2_4$ of FIG. 7, the operations of both of the main power supply circuit 21 and the supplemental power supply circuit 22 are interrupted when the power supply control signal from the exterior is not set in the ON state, and therefore, the standby current can be suppressed to "0". Further, the operation of the sequence processing circuit 30 is effected to set up the operation sequence such that the main power supply circuit 21 is operated after the supplemental power supply circuit 22 is operated at the time of turn-ON of the power source switch, that is, at the starting time of the DC-DC converter apparatus 24, and the operation of the supplemental power supply circuit 22 is interrupted after the operation of the main power supply circuit 21 is interrupted at the time of interruption of power supply of the DC-DC converter apparatus $2_4$. Therefore, the operation of the DC-DC converter apparatus $2_4$ can be started or interrupted in a stable state without setting the output voltage thereof into an abnormal condition at the time of operation starting or interruption.

Figure 9:
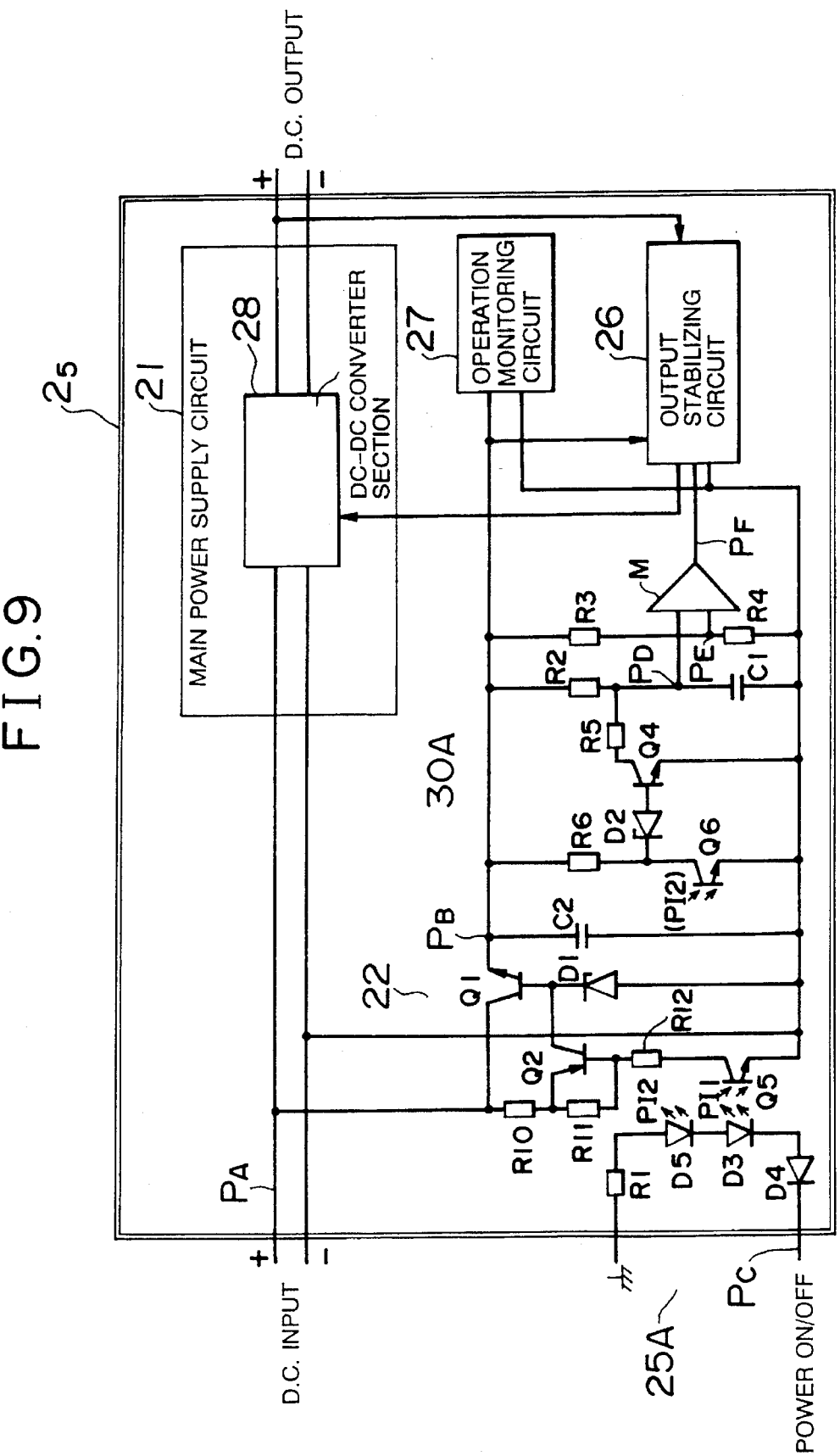
FIG. 9 is a block diagram showing the construction of a DC-DC converter apparatus according to a fifth embodiment of this invention.

The construction of a fifth embodiment of a DC-DC converter apparatus according to this invention is shown in FIG. 9. The DC-DC converter apparatus $2_5$ of FIG. 9 is a DC-DC converter apparatus having a signal processing circuit 25A and a sequence processing circuit 30A which are different from the signal processing circuit 25 and the sequence processing circuit 30 in the DC-DC converter apparatus $2_4$ of FIG. 7 and portions of FIG. 9 which are substantially the same as those of FIG. 7 are denoted by the same reference numerals.

The signal processing circuit 25A of the DC-DC converter apparatus $2_5$ shown in FIG. 9 includes two photo-isolators PI1 and PI2 and photodiodes D3 and D5 of the photo-isolators PI1 and PI2 are series-connected between a resistor R1 and a diode D4. The photo-isolator PI1 is substantially the same as the photo-isolator PI of FIG. 7. That is, like the case of FIG. 7, the collector of a phototransistor Q5 of the photo-isolator PI1 is connected to a resistor R12 and the emitter thereof is connected to the negative side power line. A phototransistor Q6 of the photo-isolator PI2 is provided in the sequence processing circuit 30A.

The sequence processing circuit 30A includes a transistor Q4, resistors R5, R6, zener diode D2, and the phototransistor Q6 of the photo-isolator PI2 described before.

The emitter of the phototransistor Q6 is connected to the negative side power line and the collector thereof is connected to the emitter of the transistor Q1 (that is, positive side power line) via the resistor R6. The transistor Q4 and resistor R5 are substantially the same as those in the sequence processing circuit 30 of FIG. 7. The zener diode D2 is connected between the base of the transistor Q4 and the collector of the phototransistor Q6.

Further, the other circuit construction is the same as that of the DC-DC converter apparatus $2_4$ of FIG. 7.

Figure 10:
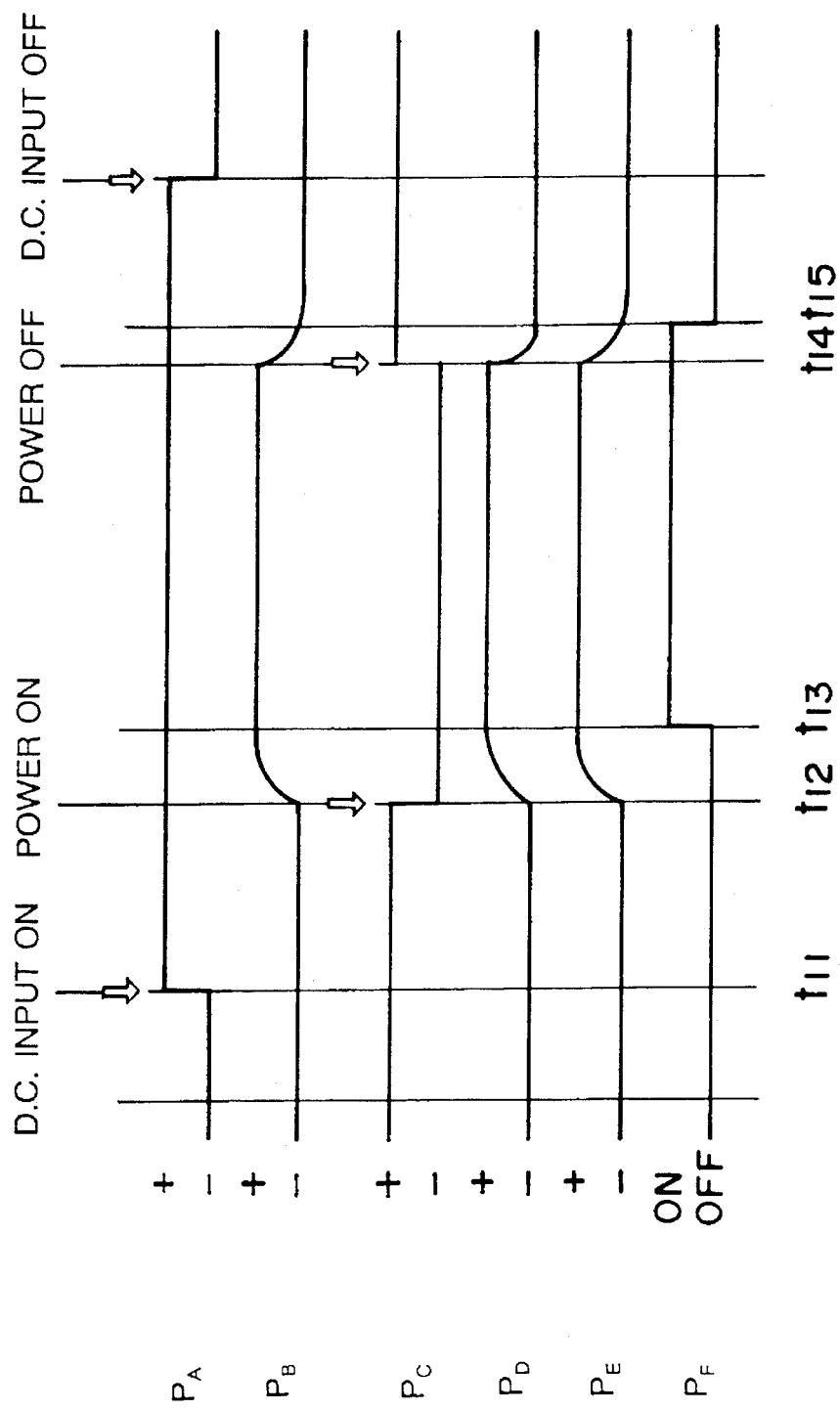
FIG. 10 is a timing chart for illustrating the operation of the DC-DC converter apparatus of FIG. 9.

FIG. 10 is a timing chart for illustrating the operation of the DC-DC converter apparatus $2_5$ of FIG. 9 according to the fifth embodiment of this invention. The operation of the DC-DC converter apparatus $2_5$ of the fifth embodiment is specifically explained with reference to FIGS. 9 and 10.

First, since the power supply control signal at the point $P_C$ is set in the OFF state ("+" level) even if a D.C. input is supplied to the DC-DC converter apparatus $2_5$ at time t11, the phototransistor Q5 of the photo-isolator PI1 and the phototransistor Q6 of the photo-isolator PI2 are both set in the OFF state. Therefore, the transistors Q2 and Q1 are also set in the OFF state to interrupt the operation of the supplemental power supply circuit 22.

Next, when the power supply control signal at the point $P_C$ is set into the ON state ("−" level) at time t12, the phototransistors Q5 and Q6 of the photo-isolators PI1 and PI2 are both set into the ON state. When the phototransistor Q5 is turned ON, a current flows into a path of resistor R10-resistor R11-resistor R12-collector of phototransistor Q5-emitter of phototransistor Q5 to turn ON the transistor Q2.

A collector output of the transistor Q2 set in the ON state is supplied to the zener diode D1 to turn ON the transistor Q1. As a result, the emitter voltage of the transistor Q1 at the point $P_B$ rises as shown in FIG. 10 and the operation of the supplemental power supply circuit 22 is started.

Further, since the zener diode D2 is set into the OFF state when the phototransistor Q6 of the photo-isolator PI2 is turned ON, the transistor Q4 is turned OFF. Therefore, the comparison input voltage of the comparator M at the point $P_D$ follows the emitter voltage of the transistor Q1 at the point $P_B$ with the time constant determined by the resistor R2 and the capacitor C1 and thus gradually rises. Further, since the reference voltage for comparison at the point $P_E$ is a voltage derived by dividing the emitter voltage of the transistor Q1 by use of the resistors R3 and R4, it gradually rises in substantially synchronism with the waveform of the emitter voltage of the transistor Q1.

Then, when the input voltage from the point $P_D$ becomes equal to or higher than the reference voltage from the point $P_E$ at time t13, an output of the comparator M is set into the ON state and issues an instruction for operation of the main power supply circuit 21 to the output stabilizing circuit 26. After this, the main power supply circuit 21 starts the operation.

On the other hand, if the power supply control signal at the point $P_C$ is set into the OFF state ("+" level in the drawing) at time t14, the phototransistor Q5 of the photo-isolator PI1 is turned OFF. When the phototransistor Q5 is turned OFF, the transistors Q2 and Q1 are both turned OFF so that the emitter voltage of the transistor Q1 at the point $P_B$ will be gradually lowered and an output of the supplemental power supply circuit 22 will be interrupted after a preset period of time.

At this time, the phototransistor Q6 of the photo-isolator PI2 is also turned OFF and the transistor Q4 is turned ON via the zener diode D2. Then, the input voltage of the comparator M at the point $P_D$ is rapidly lowered with the time constant determined by the resistor R5 and the capacitor C1.

At time t15 before the emitter voltage of the transistor Q1 at the point $P_B$ becomes equal to or higher than the operation voltage of the comparator M, the input voltage applied to the comparator M from the point $P_D$ becomes equal to or higher than the reference voltage applied to the comparator M from the point $P_E$, the comparator M cancels the instruction for operation of the main power supply circuit 21, and the main power supply circuit 21 interrupts the operation.

Also, in this case, after the operation of the main power supply circuit 21 is interrupted, the operation of the supplemental power supply circuit 22 is interrupted.

Figure 11:
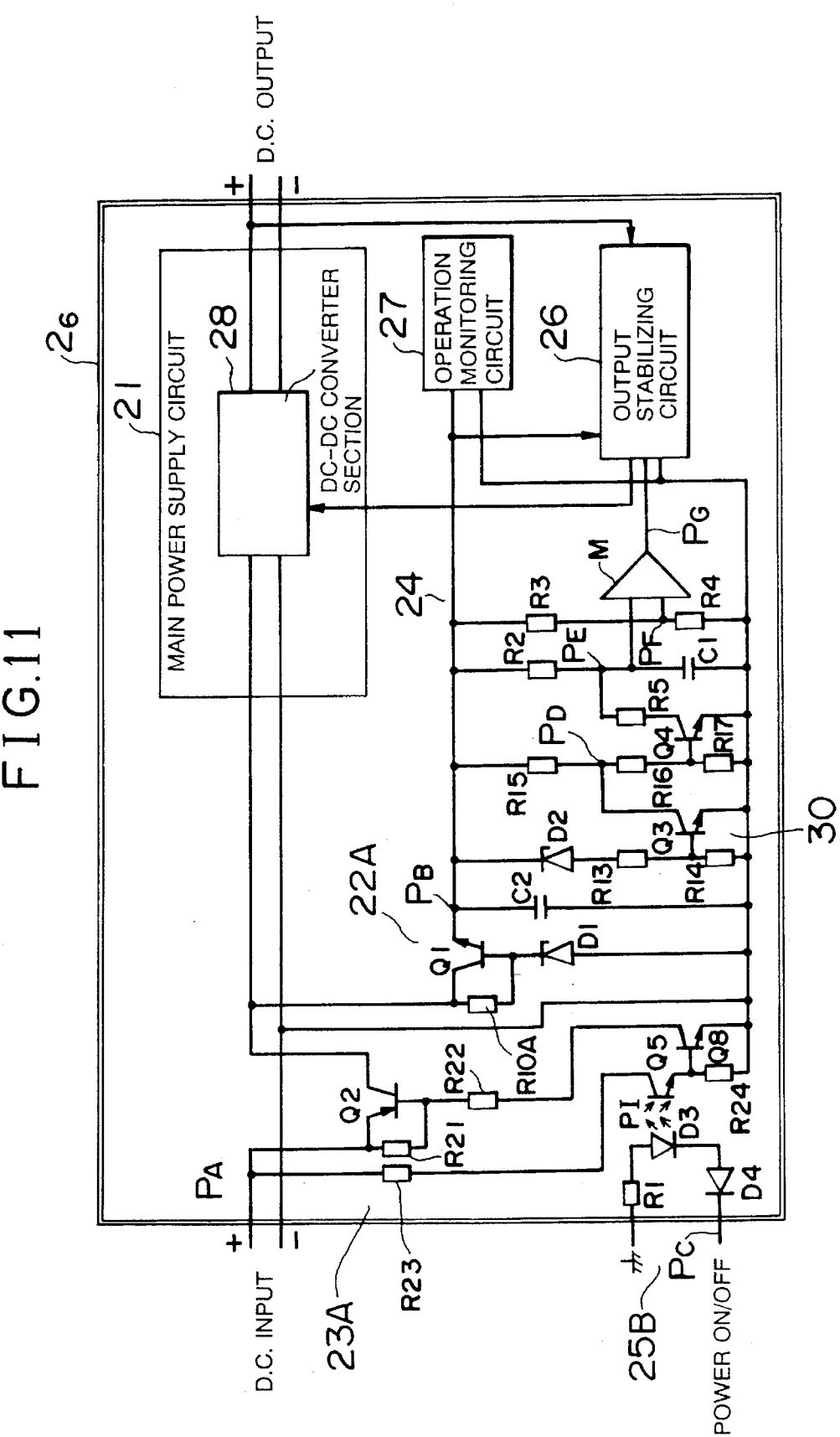
FIG. 11 is a block diagram showing the construction of a DC-DC converter apparatus according to a sixth embodiment of this invention.

The construction of a sixth embodiment of a DC-DC converter apparatus of this invention is shown in FIG. 11. The DC-DC converter apparatus $2_6$ of FIG. 11 is a DC-DC converter apparatus including a supplemental power supply circuit 22A, supplemental control circuit 23A and signal processing circuit 25B having different constructions from those of the supplemental power supply circuit 22, supplemental control circuit 23 and signal processing circuit 25 of the DC-DC converter apparatus $2_4$ of FIG. 7 and portions of FIG. 11 which are substantially the same as those of FIG. 7 are denoted by the same reference numerals.

The signal processing circuit 25B of the DC-DC converter apparatus $2_6$ shown in FIG. 11 includes resistors R23 and R24 in addition to the photo-isolator PI formed of the light emitting diode D3 and phototransistor Q5, diode D4, and resistor R1. The collector of the phototransistor Q5 is connected to the positive side (+) of the D.C. input via the resistor R23 and the emitter of the phototransistor Q5 is connected to the negative side power line via the resistor R24.

The supplemental control circuit 23A includes resistors R21, R22, transistors Q8 and Q2A. The emitter of the transistor Q2A is connected to the positive side of the D.C. input, that is, the input side of the positive side power line and the collector of the transistor Q2A is connected to the positive side input terminal of the DC-DC converter section 28 of the main power supply circuit 21 as the output side of the positive side power line. That is, the emitter-collector path (path from the emitter to the collector) of the transistor Q2A is serially connected to the positive side power line. The resistor R21 is connected between the emitter and base of the transistor Q2A. The base of the transistor Q8 is connected to the emitter of the phototransistor Q5 and the emitter of the transistor Q8 is connected to the negative side power line. The resistor R22 is connected between the base and the transistor Q2A and the collector of the transistor Q8.

The supplemental power supply circuit 22A includes a transistor Q1, zener diode D1, capacitor C2 and resistor R10A. The collector of the transistor Q1 is connected to the collector of the transistor Q2A of the supplemental control circuit 23A and the resistor R10A is connected between the collector and base of the transistor Q1.

The other circuit construction is the same as that of the DC-DC converter apparatus $2_4$ of FIG. 7.

Figure 12:
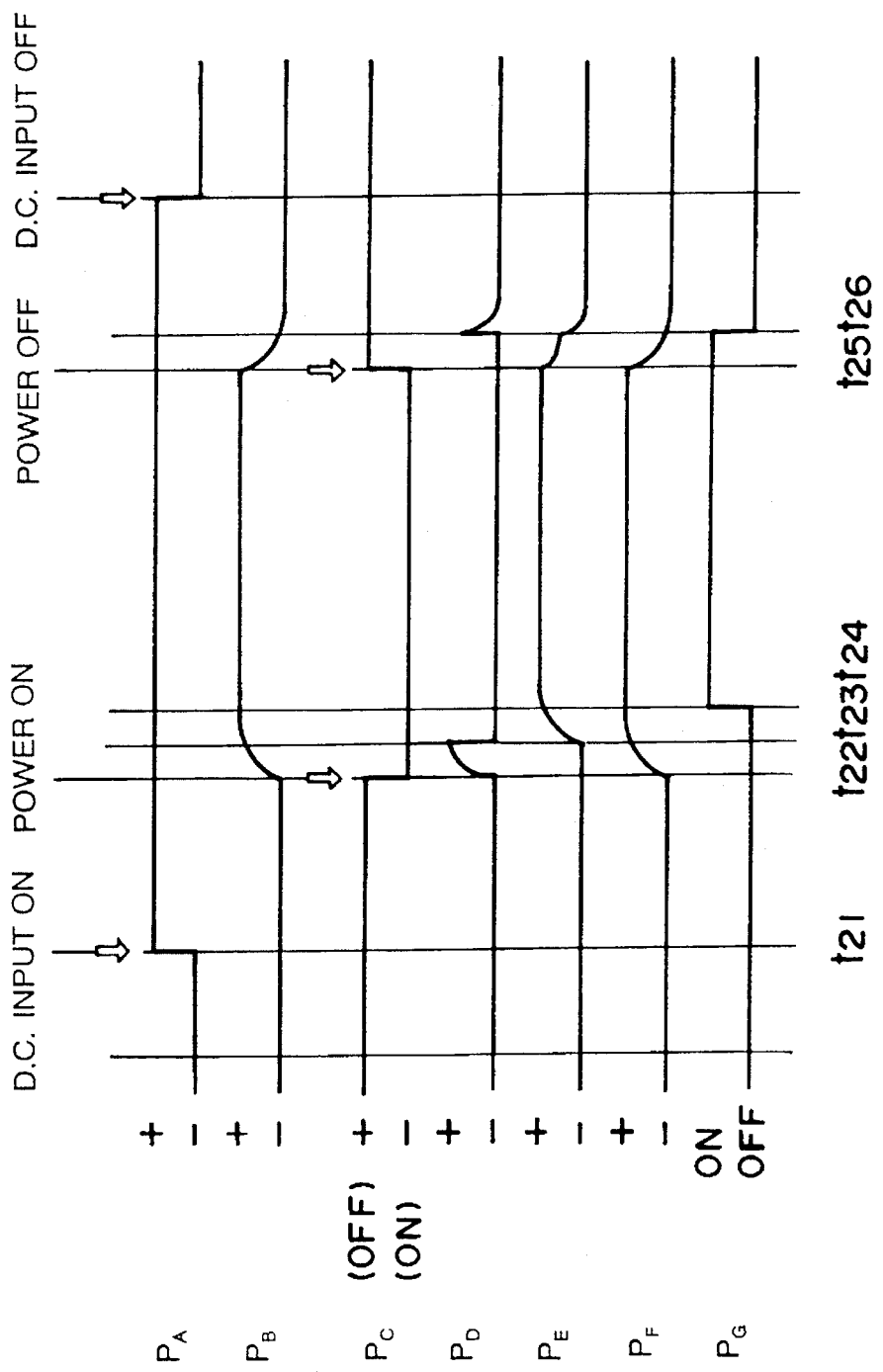
FIG. 12 is a timing chart for illustrating the operation of the DC-DC converter apparatus of FIG. 11.

FIG. 12 is a timing chart for illustrating the operation of the DC-DC converter apparatus $2_6$ of FIG. 11 according to the sixth embodiment of this invention. The operation of the sixth embodiment of the DC-DC converter apparatus $2_6$ is specifically explained with reference to FIGS. 11 and 12.

First, since the power supply control signal at the point $P_C$ is set in the OFF state ("+" level) even if a D.C. input is supplied to the DC-DC converter apparatus $2_6$ at time t21, the phototransistor Q5 of the photo-isolator PI and the transistor Q8 are both set in the OFF state. Therefore, the transistor Q2A is also set in the OFF state to interrupt the operation of the supplemental power supply circuit 22A.

Next, when the power supply control signal at the point $P_C$ is set into the ON state ("−" level) at time t22, the phototransistor Q5 of the photo-isolator PI is set into the ON state and a current flows into a path of resistor R23-collector of transistor Q5-emitter of transistor Q5-resistor R24. Then, the transistor Q8 is turned ON and a current flows into a path of resistor R21-resistor R22-collector of transistor Q8-emitter of transistor Q8, thereby causing the transistor Q2A to be turned ON.

A collector output of the transistor Q2A set in the ON state is supplied to the zener diode D1 to turn ON the transistor Q1. As a result, the emitter voltage of the transistor Q1 at the point $P_B$ rises as shown in FIG. 11 and the operation of the supplemental power supply circuit 22 is started.

With a rise in the emitter voltage of the transistor Q1, the collector voltage of the transistor Q3 at the point $P_D$ rises in the sequence processing circuit 30. If the voltage rise causes the breakdown of the zener diode D2 at time t23, the transistor Q3 is turned ON, thereby causing the collector voltage of the transistor Q3 at the point $P_D$ to be rapidly lowered.

Since the fall in the collector voltage of the transistor Q3 at the point $P_D$ causes the transistor Q4 to be turned OFF, the comparison input voltage of the comparator M at the point $P_E$ rises with the time constant determined by the resistor R2 and the capacitor C1. Further, since the reference voltage for comparison of the comparator M at the point $P_F$ is a voltage derived by dividing the emitter voltage of the transistor Q1 by use of the resistors R3 and R4, it takes a waveform similar to the waveform of the emitter voltage of the transistor Q1 as shown in FIG. 12.

Then, when the input voltage of the comparator M at the point $P_E$ becomes equal to or higher than the reference voltage at the point $P_F$ at time t24, an output of the comparator M at the point $P_G$ is set into the ON state and issues an instruction for operation of the main power supply circuit 21 to the output stabilizing circuit 26. In response to the operating instruction, the main power supply circuit 21 starts the operation.

On the other hand, if the power supply control signal at the point $P_C$ is set into the OFF state ("+" level) at time t25, the phototransistor Q5 of the photo-isolator PI is turned OFF. When the phototransistor Q5 is turned OFF, the transistor Q8 is turned OFF and the transistors Q2A and Q1 are also turned OFF so that the emitter voltage of the transistor Q1 at the point $P_B$ will be gradually lowered and an output of the supplemental power supply circuit 22A will be interrupted after a preset period of time.

If the emitter voltage of the transistor Q1 at the point $P_B$ becomes equal to or lower than a voltage determined by the zener diode D2 at time t26 before the above emitter voltage becomes equal to or lower than the reference voltage of the comparator M on the half-way of lowering in the emitter voltage of the transistor Q1 at the point $P_B$, the transistor Q3 is turned OFF and the transistor Q4 is turned ON.

At this time, the input voltage of the comparator M at the point $P_E$ is lowered with the time constant determined by the resistor R5 and the capacitor C1. Then, the input voltage at the point $P_E$ becomes equal to or lower than the reference voltage of the comparator M at the point $P_F$, the comparator M cancels the instruction for operation of the main power supply circuit 21, and the main power supply circuit 21 interrupts the operation.

Also, in this case, the operation of the supplemental power supply circuit 22 is interrupted after the operation of the main power supply circuit 21 is interrupted.

Figure 13:
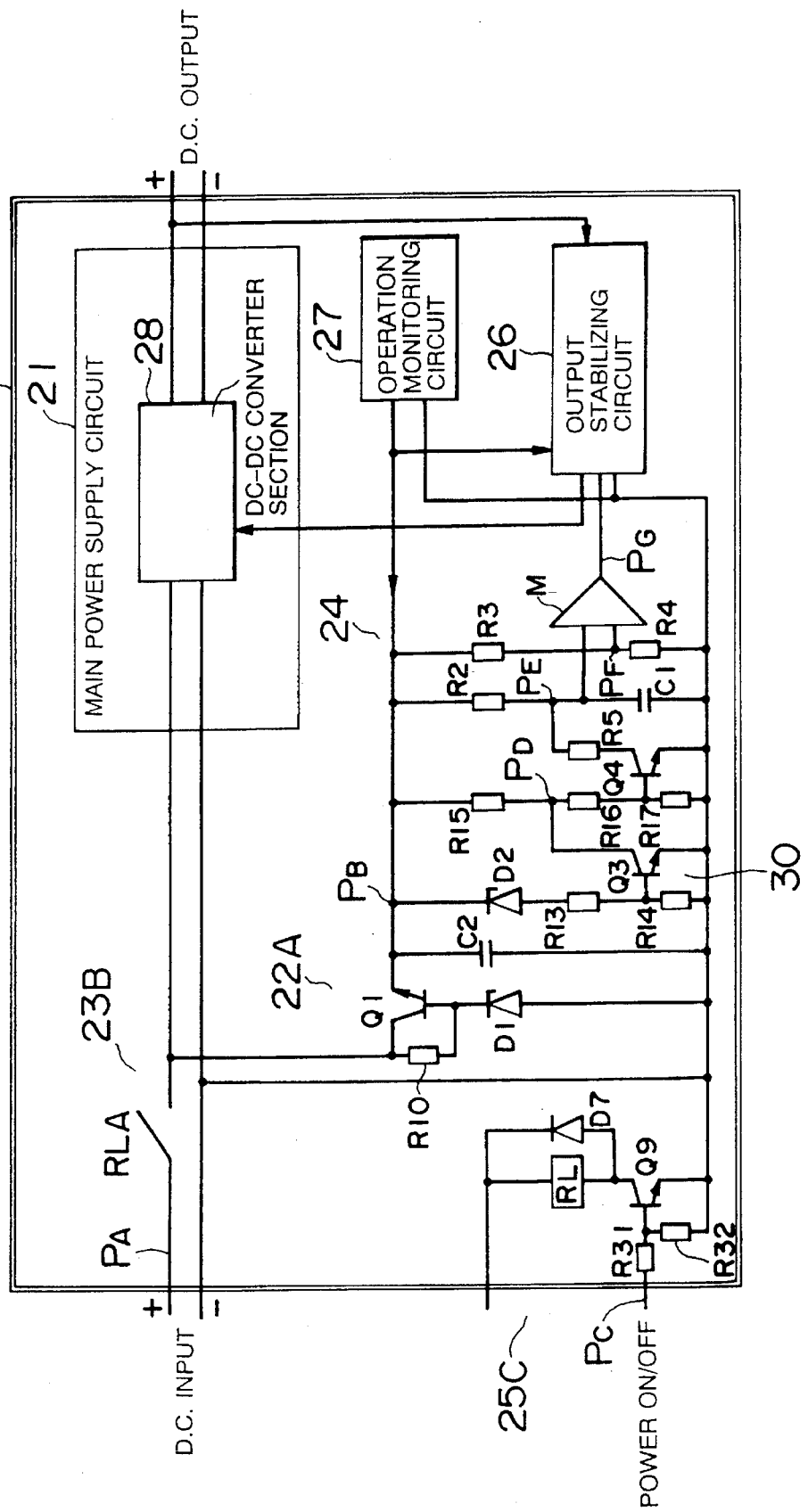
FIG. 13 is a block diagram showing the construction of a DC-DC converter apparatus according to a seventh embodiment of this invention.

The construction of a seventh embodiment of a DC-DC converter apparatus of this invention is shown in FIG. 13. The DC-DC converter apparatus $2_7$ of FIG. 13 is a DC-DC converter apparatus including a supplemental control circuit 23B and signal processing circuit 25C having different constructions from those of the supplemental control circuit 23A and signal processing circuit 25B of the DC-DC converter apparatus $2_6$ of FIG. 11 and portions of FIG. 13 which are substantially the same as those of FIG. 11 are denoted by the same reference numerals.

The signal processing circuit 25C of the DC-DC converter apparatus $2_7$ includes a transistor Q9, resistors R31, R32, diode D7 and relay (coil section) RL. A power supply control signal is supplied to the base of the transistor Q9 via the resistor R31. The resistor R32 is connected between the base and emitter of the transistor Q9 and the collector of the transistor Q9 is connected to an external D.C. power source via the relay RL (or it may be connected to the positive side D.C. input). The diode D7 is connected in parallel with the relay RL as shown in FIG. 13.

The supplemental control circuit 23B is constructed by a contact RLA of the relay RL serially connected to the positive side power line instead of the transistor Q2A of FIG. 11. The contact RLA of the relay RL is a normally open contact and is set into the ON state only when the relay (coil section) RL is energized.

The other circuit construction is the same as that of the DC-DC converter apparatus $2_6$ of FIG. 11.

Figure 14:
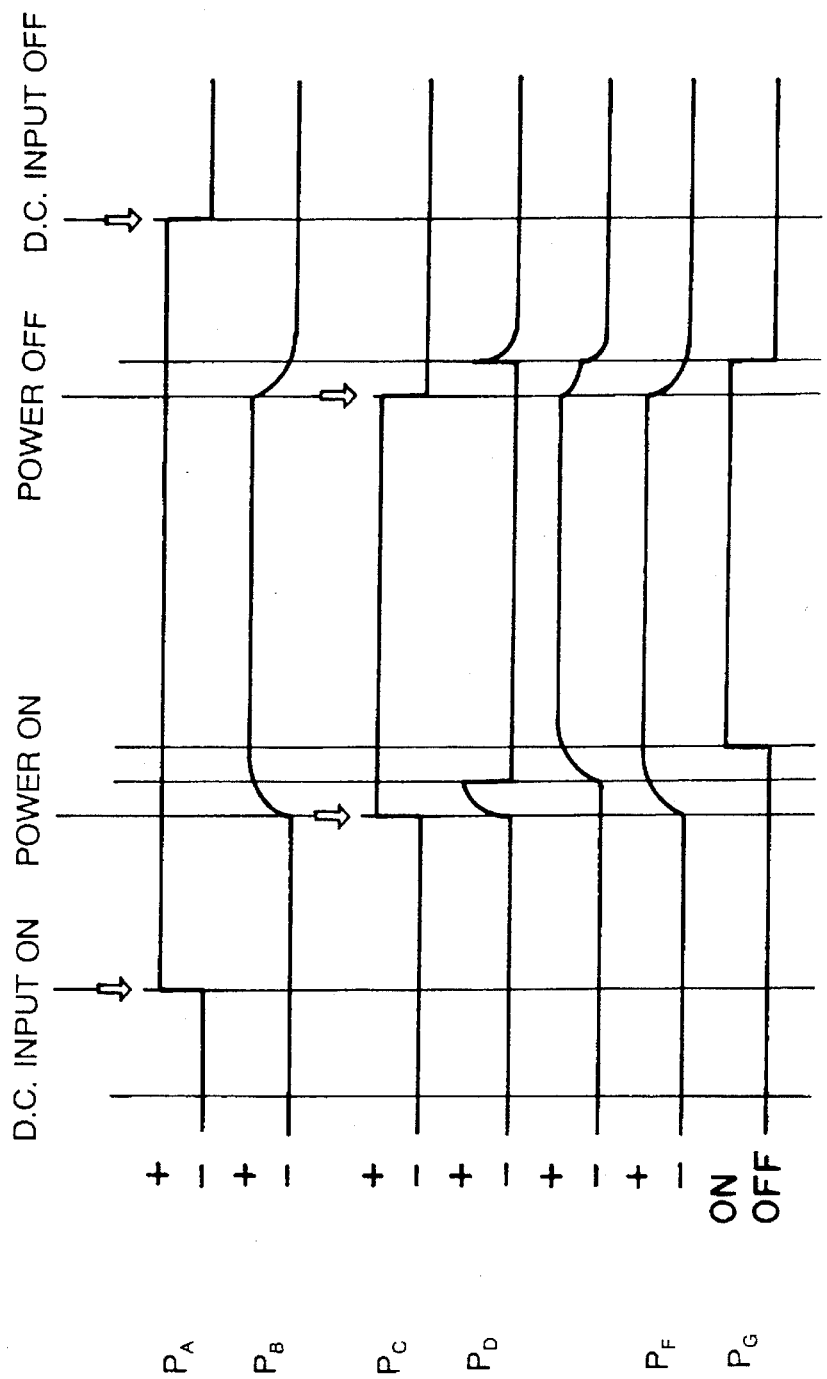
FIG. 14 is a timing chart for illustrating the operation of the DC-DC converter apparatus of FIG. 13.

FIG. 14 is a timing chart for illustrating the operation of the DC-DC converter apparatus $2_7$ of the seventh embodiment of this invention shown in FIG. 13. The operation of the DC-DC converter apparatus $2_7$ of the seventh embodiment is specifically explained with reference to FIGS. 13 and 14.

First, since the power supply control signal at the point $P_C$ is set in the OFF state ("−" level) even if a D.C. input is supplied to the DC-DC converter apparatus $2_7$ at time t31, the transistor Q9 is set in the OFF state and the relay contact RLA is set in the OFF state. Therefore, the transistor Q1 is also set in the OFF state and the operation of the supplemental power supply circuit 22A is interrupted.

Next, when the power supply control signal at the point $P_C$ is set into the ON state ("+" level) at time t32, the transistor Q9 is set into the ON state and a current flows into the relay (coil section) RL to set the relay contact into the ON state, thereby permitting a D.C. input to be supplied to the zener diode D1 so as to turn ON the transistor Q1. Therefore, as shown in FIG. 14, the emitter voltage of the transistor Q1 at the point $P_B$ rises and the operation of the supplemental power supply circuit 22A is interrupted.

With a rise in the emitter voltage of the transistor Q1, the collector voltage of the transistor Q3 at the point PD rises in the sequence processing circuit 30. If the voltage rise causes the breakdown of the zener diode D2 at time t33, the transistor Q3 is turned ON, thereby causing the collector voltage of the transistor Q3 at the point $P_D$ to be rapidly lowered.

Since the fall in the collector voltage of the transistor Q3 at the point $P_D$ causes the transistor Q4 to be turned OFF, the input voltage of the comparator M at the point $P_E$ rises with the time constant determined by the resistor R2 and the capacitor C1. Further, since the reference voltage of the comparator M at the point $P_F$ is a voltage derived by dividing the emitter voltage of the transistor Q1 by use of the resistors R3 and R4, it takes a waveform similar to the waveform of the emitter voltage of the transistor Q1 as shown in FIG. 14.

Then, when the input voltage of the comparator M at the point $P_E$ becomes equal to or higher than the reference voltage at the point $P_F$ at time t34, an output of the comparator M at the point $P_G$ is set into the ON state and issues an instruction for operation of the main power supply circuit 21 to the output stabilizing circuit 26. In response to the operating instruction, the main power supply circuit 21 starts the operation.

On the other hand, if the power supply control signal at the point $P_C$ is set into the OFF state ("−" level) at time t35, the transistor Q9 is turned OFF and the relay contact RLA of the relay RL is set into the OFF state. When the relay contact RLA is set into the OFF state, the transistor Q1 is turned OFF so that the emitter voltage of the transistor Q1 at the point $P_B$ will be gradually lowered and an output of the supplemental power supply circuit 22A will be interrupted after a preset period of time.

If the emitter voltage of the transistor Q1 at the point $P_B$ becomes equal to or lower than a voltage determined by the zener diode D2 at time t36 before the above emitter voltage becomes equal to or lower than the reference voltage of the comparator M on the half-way of lowering in the emitter voltage of the transistor Q1 at the point $P_B$, the transistor Q3 is turned OFF and the transistor Q4 is turned ON.

At this time, the input voltage of the comparator M at the point $P_E$ is lowered with the time constant determined by the resistor R5 and the capacitor C1. Then, when the input voltage at the point $P_E$ becomes equal to or lower than the reference voltage at the point $P_F$, the comparator M cancels the instruction for operation of the main power supply circuit 21, and the main power supply circuit 21 interrupts the operation. Also, in this case, the operation of the supplemental power supply circuit 22 is interrupted after the operation of the main power supply circuit 21 is interrupted.

In the fourth to seventh embodiments, an FET (field effect transistor) or another switching device may be used instead of the switching device such as the transistors Q1, Q2, Q2A and relay RL.

It is apparent that, in this invention, a wide range of different working modes can be formed based on the invention without deviating from the spirit and scope of the invention.

What is claimed is:

1. A DC-DC converter apparatus comprising:

main converter means for converting a D.C. input into a D.C. output which satisfies a preset condition and is supplied to a load;

main control means for controlling the operation of said main converter means;

supplemental power supply means for supplying operating electric power to said main converter means and said main control means;

signal processing means for generating a control signal in response to an external signal indicating an operative or a non-operative state of said DC-DC converter apparatus; and supplemental control means for receiving said control signal and for controlling the operation of said supplemental power supply means to interrupt the operation of said supplemental power supply means when said main converter means is set in the non-operative state in accordance with said received control signal.

2. A DC-DC converter apparatus according to claim 1, wherein said supplemental control means includes switching means for controlling the operative or non-operative state of said supplemental power supply means.

3. A DC-DC converter apparatus according to claim 1, wherein said supplemental control means includes switching means for selectively making or breaking a power supply path to said main converter means and said supplemental power supply means.

4. A DC-DC converter apparatus according to claim 1, further comprising sequence processing means for controlling said main control means in response to an output of said supplemental power supply means controlled by said signal processing means to operate said supplemental power supply means and said main converter means in a preset sequence.

5. A DC-DC converter apparatus according to claim 4, wherein said sequence processing means includes means for starting the operation of said main converter means after starting the operation of said supplemental power supply means when the operation of said DC-DC converter apparatus is started.

6. A DC-DC converter apparatus according to claim 4, wherein said sequence processing means includes means for interrupting the operation of said supplemental power supply means after interrupting the operation of said main converter means when the operation of said DC-DC converter apparatus is interrupted.

7. A DC-DC converter apparatus according to claim 4, wherein said sequence processing means includes timing control means for starting the operation of said main converter means after starting the operation of said supplemental power supply means when the operation of said DC-DC converter apparatus is started and interrupting the operation of said supplemental power supply means after interrupting the operation of said main converter means when the operation of said DC-DC converter apparatus is interrupted.

8. A DC-DC converter apparatus according to claim 7, wherein said timing control means includes means for substantially interrupting the operation of said main converter means prior to substantial interruption of the operation of said supplemental power supply means by use of a time constant of said supplemental power supply means at least at the time of said interruption.

9. A DC-DC converter apparatus according to claim 1, wherein said main control means further includes output stabilizing means for monitoring and stabilizing an output voltage of said main converter means.

10. A DC-DC converter apparatus according to claim 1, further comprising operation monitoring means for monitoring whether or not an abnormal condition occurs in the operation of said main converter means.

* * * * *

UNITED STATES PATENT AND TRADEMARK OFFICE
CERTIFICATE OF CORRECTION

PATENT NO. : 5,532,914
DATED : July 2, 1996
INVENTOR(S) : Hironobu KAGEYAMA et al.

It is certified that error appears in the above-indentified patent and that said Letters Patent is hereby corrected as shown below:

Column 5, line 53, delete "22" and insert --$2_2$--.

Column 6, line 52, delete "22" and insert --$2_2$--.

Column 7, line 11, delete "I" and insert --1--.

Column 12, line 6, delete "PD" and insert --$P_D$--.

Column 13, line 7, delete "24" and insert --$2_4$--.

Signed and Sealed this

Fifth Day of November, 1996

Attest:

BRUCE LEHMAN

*Attesting Officer*   *Commissioner of Patents and Trademarks*